(12) United States Patent
Park

(10) Patent No.: US 11,829,633 B2
(45) Date of Patent: Nov. 28, 2023

(54) MEMORY SYSTEM, METHOD OF OPERATING THE SAME AND STORAGE DEVICE USING THE SAME

(71) Applicant: SAMSUNG ELECTRONICS CO., LTD., Suwon-si (KR)

(72) Inventor: Jiwoon Park, Suwon-si (KR)

(73) Assignee: Samsung Electronics Co., Ltd.

( * ) Notice: Subject to any disclaimer, the term of this patent is extended or adjusted under 35 U.S.C. 154(b) by 254 days.

(21) Appl. No.: 17/198,742

(22) Filed: Mar. 11, 2021

(65) Prior Publication Data
US 2022/0050621 A1 Feb. 17, 2022

(30) Foreign Application Priority Data
Aug. 11, 2020 (KR) ........................ 10-2020-0100322

(51) Int. Cl.
*G06F 3/00* (2006.01)
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0655; G06F 3/0604; G06F 3/0679
See application file for complete search history.

(56) References Cited

U.S. PATENT DOCUMENTS

| 7,308,058 B2 | 12/2007 | Zerbe et al. |
| 9,246,598 B2 | 1/2016 | Asmanis et al. |
| 10,128,842 B1 | 11/2018 | Lin |
| 10,630,414 B2 | 4/2020 | Nagarajan |
| 2009/0316485 A1 | 12/2009 | Heo et al. |
| 2014/0016404 A1 | 1/2014 | Kim et al. |
| 2019/0102330 A1* | 4/2019 | Hasbun ................ G11C 7/1069 |
| 2020/0125505 A1* | 4/2020 | Brox ................... G11C 7/1084 |

FOREIGN PATENT DOCUMENTS

KR   10-2020-0008709 A   1/2020

OTHER PUBLICATIONS

Communication dated Nov. 26, 2021 by the European Patent Office for European Patent Application No. 21175829.7.

* cited by examiner

*Primary Examiner* — Craig S Goldschmidt
(74) *Attorney, Agent, or Firm* — Fish & Richardson P.C.

(57) ABSTRACT

A memory system includes a memory controller and M memory chips. The memory controller generates a first data signal having one of $2^M$ voltage levels different from each other, where M is a natural number greater than or equal to two, and outputs the first data signal through a first channel. The first data signal represents first data including M bits. The M memory chips are commonly connected to the memory controller through the first channel. When the M memory chips have an enabled state, the M memory chips simultaneously receives the first data signal transmitted through the first channel from the memory controller, and simultaneously obtains the M bits included in the first data based on the first data signal. Each of the M memory chips obtains a respective one of the M bits, and operates based on the respective one of the M bits.

20 Claims, 22 Drawing Sheets

|  | DAT11 ||
|---|---|---|
|  | B11 | B21 |
| VL11 | 1 | 1 |
| VL21 | 1 | 0 |
| VL31 | 0 | 1 |
| VL41 | 0 | 0 |

FIG. 12B

|      | DAT12 | | |
| --- | --- | --- | --- |
|      | B12 | B22 | B32 |
| VL12 | 1 | 1 | 1 |
| VL22 | 1 | 1 | 0 |
| VL32 | 1 | 0 | 1 |
| VL42 | 1 | 0 | 0 |
| VL52 | 0 | 1 | 1 |
| VL62 | 0 | 1 | 0 |
| VL72 | 0 | 0 | 1 |
| VL82 | 0 | 0 | 0 |

MEMORY SYSTEM, METHOD OF OPERATING THE SAME AND STORAGE DEVICE USING THE SAME

CROSS-REFERENCE TO RELATED APPLICATION

This application claims priority under 35 USC § 119 to Korean Patent Application No. 10-2020-0100322, filed on Aug. 11, 2020 in the Korean Intellectual Property Office (KIPO), the contents of which are herein incorporated by reference in their entirety.

BACKGROUND

1. Technical Field

Example embodiments relate generally to semiconductor integrated circuits, and more particularly to memory systems, methods of operating the memory systems, and storage devices using the memory systems.

2. Description of the Related Art

Certain types of data storage devices include one or more semiconductor memory devices. Examples of such data storage devices include solid state drives (SSDs). These types of data storage devices may have various design and/or performance advantages over hard disk drives (HDDs). Examples of potential advantages include the absence of moving mechanical parts, higher data access speeds, stability, durability, and/or low power consumption. Recently, various systems, e.g., a laptop computer, a car, an airplane, a drone, etc., have adopted the SSDs for data storage.

As an operating speed of a host device that controls the data storage device increases, an interface speed between a memory controller and the semiconductor memory device that are included in the data storage device also needs to increase. Accordingly, various technologies have been researched to increase the interface speed.

SUMMARY

It is an aspect to provide a memory system capable of having improved or enhanced performance while a signal is transmitted based on a multi-level signaling.

It is another aspect to provide a method of operating the memory system.

It is yet another aspect to provide a storage device using the memory system.

According to an aspect of one or more example embodiments, there is provided a memory system includes a memory controller and M memory chips. The memory controller generates a first data signal having one of $2^M$ voltage levels different from each other, where M is a natural number greater than or equal to two, and outputs the first data signal through a first channel. The first data signal represents first data including M bits. The M memory chips are commonly connected to the memory controller through the first channel. When the M memory chips have an enabled state, the M memory chips simultaneously receives the first data signal transmitted through the first channel from the memory controller, and simultaneously obtains the M bits included in the first data based on the first data signal. Each of the M memory chips obtains a respective one of the M bits, and operates based on the respective one of the M bits.

According to another aspect of one or more example embodiments, there is provided a method of operating a memory system that includes a memory controller and M memory chips, where M is a natural number greater than or equal to two, the M memory chips commonly connected to the memory controller through a first channel are enabled. A first data signal having one of $2^M$ voltage levels that are different from each other is generated by the memory controller. The first data signal represents first data including M bits. The first data signal is output through the first channel by the memory controller. When the M memory chips have an enabled state, the first data signal transmitted through the first channel is simultaneously received by the M memory chips. The M bits included in the first data are simultaneously obtained by the M memory chips based on the first data signal. Each of the M memory chips obtains a respective one of the M bits and operates based on the respective one of the M bits.

According to yet another aspect of one or more example embodiments, there is provided a storage device includes a first channel, a storage controller, a first nonvolatile memory chip and a second nonvolatile memory chip. The storage controller is connected to the first channel, generates a first chip enable signal and a second chip enable signal, generates a first data signal having one of a first voltage level, a second voltage level, a third voltage level and a fourth voltage level, the first through fourth voltage levels being different from each other, and outputs the first data signal through the first channel. The first data signal represents first data including a first bit and a second bit. The first nonvolatile memory chip and the second nonvolatile memory chip are commonly connected to the storage controller through the first channel. The first nonvolatile memory chip receives the first chip enable signal, and the second nonvolatile memory chip receives the second chip enable signal. The first nonvolatile memory chip is enabled by activating the first chip enable signal, and is set such that the first nonvolatile memory chip obtains the first bit based on the first data signal. The second nonvolatile memory chip is enabled by activating the second chip enable signal, and is set such that the second nonvolatile memory chip obtains the second bit based on the first data signal. The first and second nonvolatile memory chips are enabled by activating the first and second chip enable signals. When both of the first and second nonvolatile memory chips have an enabled state, the first and second nonvolatile memory chips simultaneously receive the first data signal transmitted through the first channel, simultaneously obtain the first and second bits included in the first data based on the first data signal, and simultaneously perform a data write operation based on the first and second bits.

According to another aspect of one or more example embodiments, there is provided a memory system comprising a memory controller configured to generate a first data signal according to a multi-level signaling scheme, the first data signal representing first data including a plurality of bits; and a plurality of memory chips commonly connected to the memory controller through one physical channel, wherein the plurality of memory chips simultaneously receive the first data signal through the one physical channel and each of the plurality of memory chips obtains simultaneously a respective one of the plurality of bits included in the first data based on the first data signal.

BRIEF DESCRIPTION OF THE DRAWINGS

Illustrative, non-limiting example embodiments will be more clearly understood from the following detailed description taken in conjunction with the accompanying drawings, in which:

FIGS. 12A and 12B are diagrams for describing a first data signal transmitted through a first channel included in the memory system of FIG. 11;

DETAILED DESCRIPTION

Figure 1:
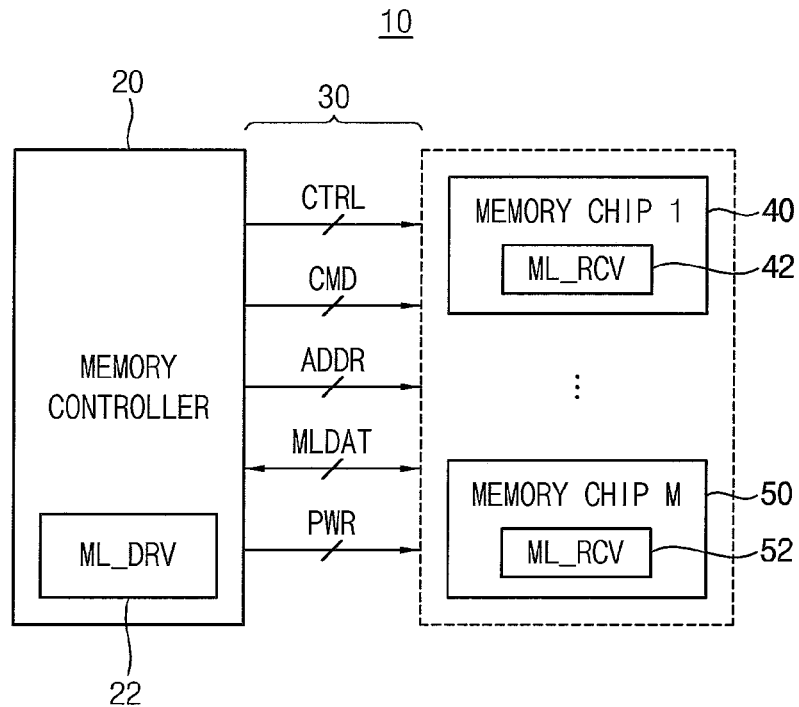
FIG. 1 is a block diagram illustrating a memory system according to example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

In a memory system, a method of operating the memory system and a storage device according to example embodiments, a data signal may be exchanged using a multi-level signaling scheme (e.g., a PAM scheme). For example, memory chips commonly connected to a memory controller through one channel may be simultaneously enabled. When the memory chips connected to the one channel have an enabled state, the data signal may be simultaneously received and acquired, and a data write operation may be simultaneously performed based on the data signal. In addition, when the memory chips connected to the one channel have the enabled state, the data signal may be simultaneously output and transmitted, and the data read operation may be simultaneously performed based on the data signal. Accordingly, the operation performance, the interface performance and the data write/read performance of overall system may be improved or enhanced.

FIG. 1 is a block diagram illustrating a memory system according to example embodiments.

Referring to FIG. 1, a memory system 10 includes a memory controller 20 and M memory chips 40 and 50, where M is a natural number greater than or equal to two. The memory system 10 may further include a plurality of signal lines 30 that electrically connect the memory controller 20 with the memory chips 40 and 50.

The M memory chips 40 and 50 are controlled by the memory controller 20. For example, based on requests from a host (not illustrated), the memory controller 20 may store (e.g., write or program) data into the memory chips 40 and 50, or may retrieve (e.g., read or sense) data from the memory chips 40 and 50.

The plurality of signal lines 30 may include control lines, command lines, address lines, data input/output (I/O) lines and power lines. The memory controller 20 may transmit a command CMD, an address ADDR and a control signal CTRL to the memory chips 40 and 50 via the command lines, the address lines and the control lines, may exchange a data signal MLDAT with the memory chips 40 and 50 via the data I/O lines, and may transmit a power supply voltage PWR to the memory chips 40 and 50 via the power lines. For example, the control signal CTRL may include a chip enable signal (CE), a write enable signal (WE), a read enable signal (RE), a command latch enable signal (CLE), an address latch enable signal (ALE), etc.

Although not illustrated in FIG. 1, the plurality of signal lines 30 may further include data strobe signal (DQS) lines for transmitting a DQS signal. The DQS signal may be a signal for providing a reference time point used to determine a logic value of the data signal MLDAT exchanged between the memory controller 20 and the memory chips 40 and 50. However, as illustrated in FIG. 1, in some example embodiments, the DQS signal may be omitted.

In some example embodiments, at least a part or all of the signal lines 30 may be referred to as a channel. The term "channel" as used herein may represent signal lines that include the data I/O lines for transmitting the data signal MLDAT. However, example embodiments are not limited thereto, and in some example embodiment the "channel" may further include the command lines for transmitting the command CMD and/or the address lines for transmitting the address ADDR.

The M memory chips 40 and 50 are commonly connected to the memory controller 20 through one channel. The memory controller 20 generates the data signal MLDAT based on a multi-level signaling scheme, and outputs the data signal MLDAT through the one channel. For example, the memory controller 20 may generate the data signal MLDAT having one of $2^M$ voltage levels different from each other, and the data signal MLDAT may represent data including M bits. For example, the memory controller 20 may include a data driving circuit (ML_DRV) 22 that generates the data signal MLDAT.

A multi-level signaling scheme may be used to compress the bandwidth required to transmit data at a given bit rate. In a simple binary scheme, two single symbols, usually two voltage levels, may be used to represent '1' and '0,' and thus the symbol rate may be equal to the bit rate. In contrast, the principle of the multi-level signaling scheme may be to use a larger alphabet of m symbols to represent data, so that each symbol may represent more than one bit of data. As a result, the number of symbols that needs to be transmitted may be less than the number of bits (e.g., the symbol rate may be less than the bit rate), and thus the bandwidth may be compressed. The alphabet of symbols may be constructed from a number of different voltage levels. For example, in a four-level scheme, groups of two data bits may be mapped to one of four symbols. Only one symbol need be transmitted for each pair of data bits, so the symbol rate may be a half of the bit rate.

In other words, the multi-level signaling scheme may be used to increase a data transmission (or transfer) rate without increasing the frequency of data transmission and/or a transmission power of the communicated data. An example of one type of the multi-level signaling scheme may be a pulse amplitude modulation (PAM) scheme, where a unique symbol of a multi-level signal may represent a plurality of bits of data. The number of possible pulse amplitudes in a digital PAM scheme may be some power of two. For example, there may be $2^2$ possible discrete pulse amplitudes in a 4-level PAM (e.g., in PAM4), there may be $2^3$ possible discrete pulse amplitudes in an 8-level PAM (e.g., in PAM8), and there may be $2^4$ possible discrete pulse amplitudes in a 16-level PAM (e.g., in PAM16).

When or while the M memory chips 40 and 50 connected to the one channel have an enabled state, the M memory chips 40 and 50 simultaneously receive the data signal MLDAT transmitted through the one channel, and simultaneously operate based on the data signal MLDAT. For example, the M memory chips 40 and 50 simultaneously obtain or acquire the M bits included in the data based on the data signal MLDAT. Each of the M memory chips 40 and 50 obtains a respective one of the M bits, and operates based on the respective one of the M bits. For example, each of the M memory chips 40 and 50 may include a respective one of data receiving circuits (ML_RCV) 42 and 52 that obtains the respective one of the M bits.

For example, the data receiving circuit 42 included in the memory chip 40 may obtain a first bit among the M bits based on the data signal MLDAT, the data receiving circuit 52 included in the memory chip 50 may obtain an M-th bit among the M bits based on the data signal MLDAT, and time points or timings at which the data receiving circuits 42 and 52 obtain the first bit and the M-th bit may be substantially the same as each other. The memory chips 40 and 50 may simultaneously obtain the M bits and may simultaneously operate (e.g., may perform a data write operation) based on the M bits.

Hereinafter, example embodiments will be described in detail based on various examples of the multi-level signaling scheme (e.g., the PAM scheme) and various examples of the memory controller and the memory chips according thereto.

Figure 2:
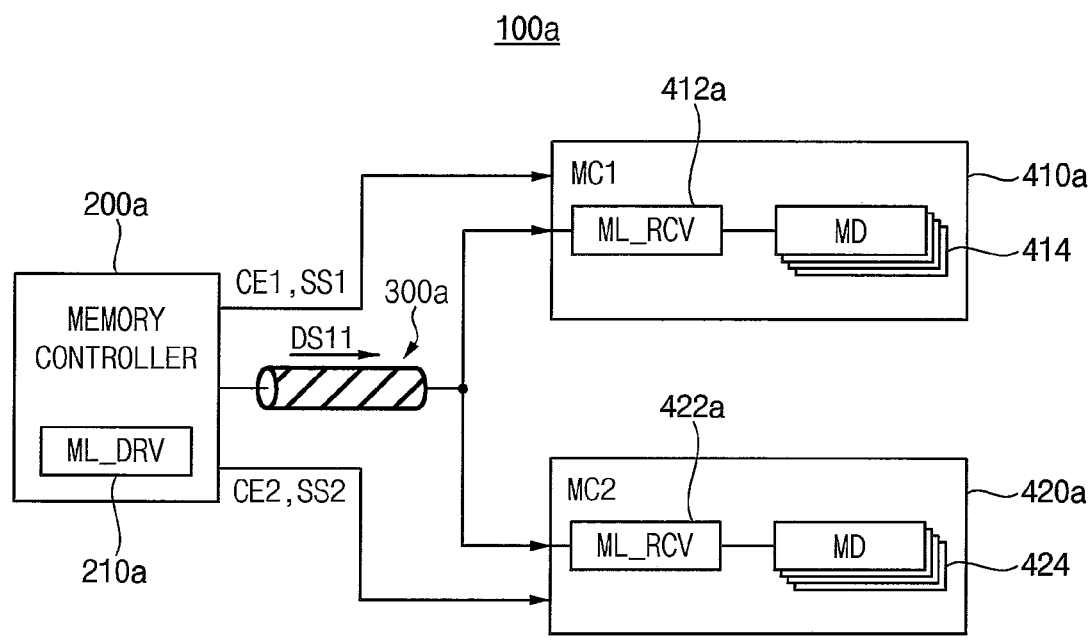
FIG. 2 is a block diagram illustrating an example of the memory system of FIG. 1, according to an example embodiment.

FIG. 2 is a block diagram illustrating an example of the memory system of FIG. 1.

Referring to FIG. 2, a memory system 100a includes a memory controller 200a, a first channel 300a, a first memory chip 410a and a second memory chip 420a. FIG. 2 illustrates a more detailed example of the memory system 10 of FIG. 1 where M is 2 and a data signal is generated based on the 4-level scheme (e.g., the PAM4 scheme).

The memory controller 200a generates a first data signal DS11 having one of four voltage levels, and outputs the first data signal DS11 through the first channel 300a. The first data signal DS11 represents first data including two bits. For example, as will be described with reference to FIGS. 6A, 6C and 6D, the first data signal DS11 may have one of a first voltage level VL11, a second voltage level VL21, a third voltage level VL31 and a fourth voltage level VL41 that are different from each other, and the first data DAT11 may include a first bit B11 and a and second bit B21.

The memory controller 200a may include a data driving circuit (ML_DRV) 210a that generates the first data signal DS11. An example configuration of the data driving circuit 210a will be described with reference to FIG. 7.

The memory controller 200a may generate a first chip enable signal CE1, a first sensing setting signal SS1, a second chip enable signal CE2 and a second sensing setting signal SS2, may provide the first chip enable signal CE1 and the first sensing setting signal SS1 to the first memory chip 410a, and may provide the second chip enable signal CE2 and the second sensing setting signal SS2 to the second memory chip 420a. The first and second chip enable signals CE1 and CE2 may be used for controlling operations of enabling and disabling the first and second memory chips 410a and 420a, respectively. The first and second sensing setting signals SS1 and SS2 may be used for setting operations in which the first and second memory chips 410a and 420a receive the first data signal DS11, respectively. For example, in some example embodiments, the first and second chip enable signals CE1 and CE2 and the first and second sensing setting signals SS1 and SS2 may be provided to the first and second memory chips 410a and 420a, respectively, through a signal path different from the first channel 300a.

The first and second memory chips 410a and 420a are commonly connected to the memory controller 200a through the first channel 300a, are enabled or activated based on the first and second chip enable signals CE1 and CE2, respectively, and simultaneously receive the first data signal DS11 transmitted from the memory controller 200a through the first channel 300a when or while both the first and second memory chips 410a and 420a have an enabled state. The first memory chip 410a may obtain the first bit B11 based on the first data signal DS11, and may operate based on the first bit B11. The second memory chip 420a may obtain the second bit B21 based on the first data signal DS11, and may operate based on the second bit B21. The first and second memory chips 410a and 420a may simultaneously obtain the first and second bits B11 and B21.

In some example embodiments, the first data DAT11 including the first and second bits B11 and B21 may be a part or portion of write data provided from the memory controller 200a, and the first and second memory chips 410a and 420a may simultaneously perform a data write operation based on the first and second bits B11 and B21. For example, the data write operation may be a random write operation. Although not illustrated in FIG. 2, a write command and a write address for performing the data write operation may be provided from the memory controller 200a.

The first memory chip 410a may include a first data receiving circuit (ML_RCV) 412a and a plurality of first memory devices (MD) 414. The first data receiving circuit (ML_RCV) 412a may obtain the first bit B11 based on the first data signal DS11. An example configuration of the first data receiving circuit (ML_RCV) 412a will be described with reference to FIG. 8. One of the plurality of first memory devices 414 may be accessed based on the first bit B11. For example, the plurality of first memory devices 414 may form a plurality of ways, one of the plurality of ways may be enabled, and the first bit B11 may be written into a memory device corresponding to the enabled way among the plurality of first memory devices 414.

The second memory chip 420a may include a second data receiving circuit (ML_RCV) 422a and a plurality of second memory devices 424. The second data receiving circuit (ML_RCV) 422a may obtain the second bit B21 based on the first data signal DS11. One of the plurality of second memory devices 424 may be accessed based on the second bit B21. The second memory chip 420a may have a configuration substantially the same as that of the first memory chip 410a.

In some example embodiments, as will be described with reference to FIG. 9, before both of the first and second memory chips 410a and 420a have the enabled state and simultaneously receive the first data signal DS11, the first memory chip 410a may be enabled and may be set such that the first memory chip 410a obtains the first bit B11 based on the first data signal DS11, and the second memory chip 420a may be enabled and may be set such that the second memory chip 420a obtains the second bit B21 based on the first data signal DS11. Such setting operation may be performed based on the first and second sensing setting signals SS1 and SS2.

In some example embodiments, when the memory devices 414 and 424 are nonvolatile memory devices, the memory chips 410a and 420a may be nonvolatile memory chips. In some example embodiments, when the memory devices 414 and 424 are volatile memory devices, the memory chips 410a and 420a may be volatile memory chips.

Figure 3:
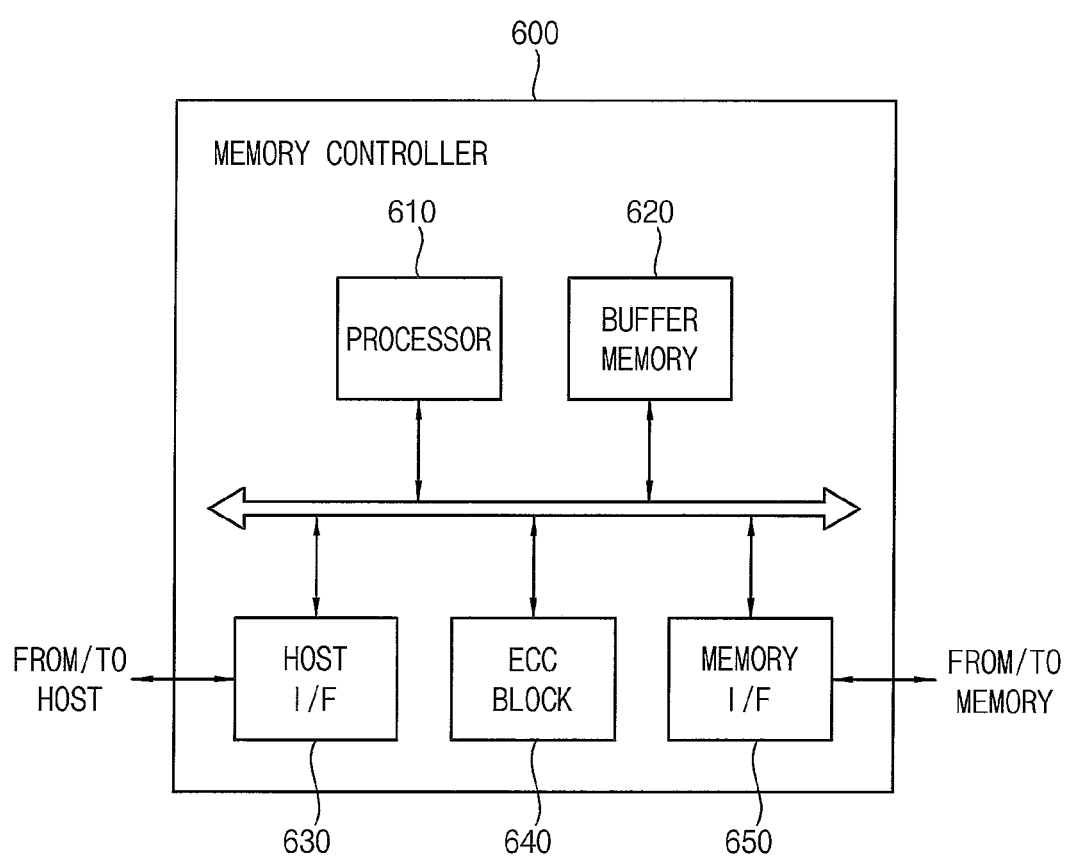
FIG. 3 is a block diagram illustrating an example of a memory controller included in a memory system according to example embodiments.

FIG. 3 is a block diagram illustrating an example of a memory controller included in the memory system according to example embodiments.

Referring to FIG. 3, a memory controller 600 may include at least one processor 610, a buffer memory 620, a host interface (I/F) 630, an error correction code (ECC) block 640 and a memory interface (I/F) 650.

The processor 610 may control an operation of the memory controller 600 in response to a command and/or request received via the host interface 630 from an external host (not illustrated). For example, the processor 610 may control respective components by employing firmware for operating memory chips (e.g., the memory chips 40 and 50 in FIG. 1).

The buffer memory 620 may store instructions and data executed and processed by the processor 610. For example, the buffer memory 620 may be implemented with a volatile memory device such as a dynamic random access memory (DRAM), a static random access memory (SRAM), a cache memory, or the like.

The host interface (I/F) 630 may provide physical connections between the host and the memory controller 600. The host interface 630 may provide an interface corresponding to a bus format of the host for communication between the host and the memory controller 600. In some example embodiments, the bus format of the host may be a small computer system interface (SCSI) or a serial attached SCSI (SAS) interface. In other example embodiments, the bus format of the host may be a USB, a peripheral component interconnect (PCI) express (PCIe), an advanced technology attachment (ATA), a parallel ATA (PATA), a serial ATA (SATA), a nonvolatile memory (NVM) express (NVMe), etc., format.

The ECC block 640 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The memory interface (I/F) 650 may exchange data with the memory chips. The memory interface 650 may transmit a command and an address to the memory chips, and may transmit data to the memory chips or receive data read from the memory chips. Although not illustrated in FIG. 3, a data driving circuit (e.g., the data driving circuit (ML_DRV) 22 in FIG. 1) that generates a data signal based on the multi-level signaling scheme according to example embodiments may be included in the memory interface 650.

Figure 4:
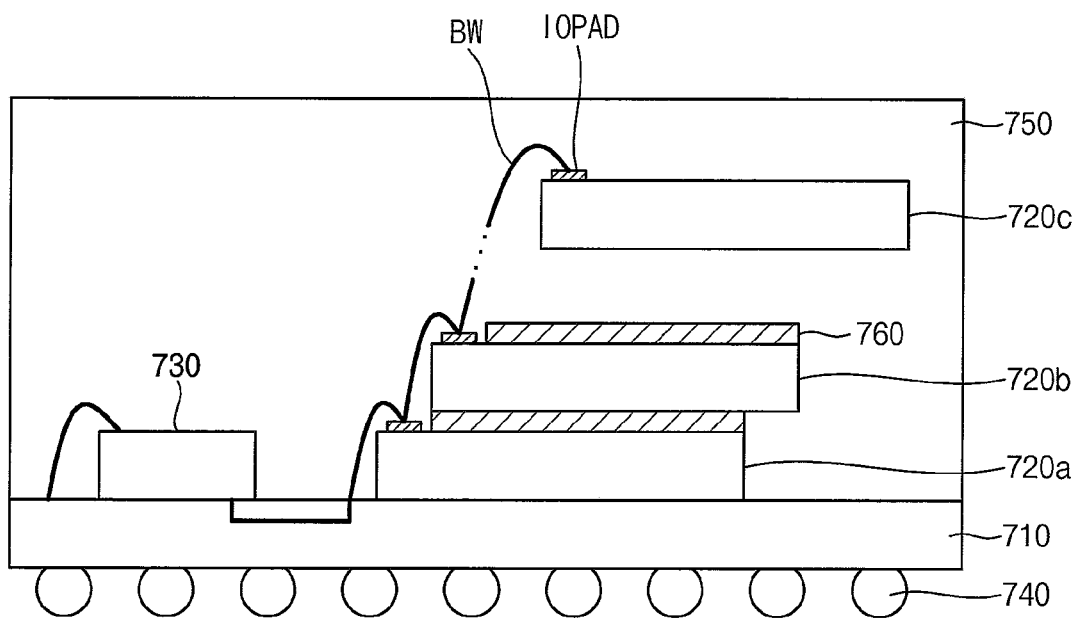
FIG. 4 is a cross-sectional view of a memory chip included in a memory system according to example embodiments.

FIG. 4 is a cross-sectional view of a memory chip included in a memory system according to example embodiments. The memory chip illustrated in FIG. 4 may correspond to the M memory chips 40 and 50, illustrated in FIG. 1 or the memory chips 410a and 420a illustrated in FIG. 2.

Referring to FIG. 4, a memory chip 700 may include a base substrate (or package substrate) 710, a plurality of memory devices 720a, 720b and 720c, a buffer circuit 730, a plurality of conductive bumps 740, a sealing member 750 and a plurality of adhesive members 760. The memory chip 700 may be implemented as a multi-stacked chip package.

The plurality of memory devices 720a, 720b and 720c may be sequentially stacked on the base substrate 710, and each of the plurality of memory devices 720a, 720b and 720c may include a plurality of I/O pads IOPAD. For example, the plurality of I/O pads IOPAD may include data I/O pads, command pads, address pads, etc.

In some example embodiments, the plurality of memory devices 720a, 720b and 720c may be stacked on the base substrate 710 such that a surface on which the plurality of I/O pads IOPAD may be disposed to face upwards. In some example embodiments, with respect to each of the plurality of memory devices 720a, 720b and 720c, the plurality of I/O pads IOPAD may be arranged near one side of each memory device. As such, the plurality of memory devices 720a, 720b and 720c may be stacked scalariformly, that is, in a step shape, such that the plurality of I/O pads IOPAD of each memory die may be exposed (e.g., the plurality of I/O pads IOPAD may be exposed on the edge of each step). In such stacked state, the plurality of memory devices 720a, 720b and 720c may be electrically connected to one another and the base substrate 710 through the plurality of I/O pads IOPAD and a plurality of bonding wires BW.

The buffer circuit 730 may be formed on the base substrate 710, and may be electrically connected to the plurality of memory devices 720a, 720b and 720c through the plurality of bonding wires BW. Although not illustrated in FIG. 4, a data receiving circuit (e.g., the data receiving circuits (ML_RCV) 42 and 52 in FIG. 1) that receives a data signal generated based on the multi-level signaling scheme according to example embodiments may be included in the buffer circuit 730.

The plurality of memory devices 720a, 720b and 720c, the buffer circuit 730 and the plurality of bonding wires BW may be fixed by the sealing member 750, and the plurality of adhesive members 760 may intervene between the plurality of memory devices 720a, 720b and 720c. The plurality of conductive bumps 740 may be disposed on a bottom surface of the base substrate 710 for electrical connections to an external device.

Although not illustrated in FIG. 4, in some example embodiments, the plurality of memory devices 720a, 720b and 720c may be electrically connected to each other using through silicon vias (TSVs) instead of the bonding wires BW.

Figure 5:
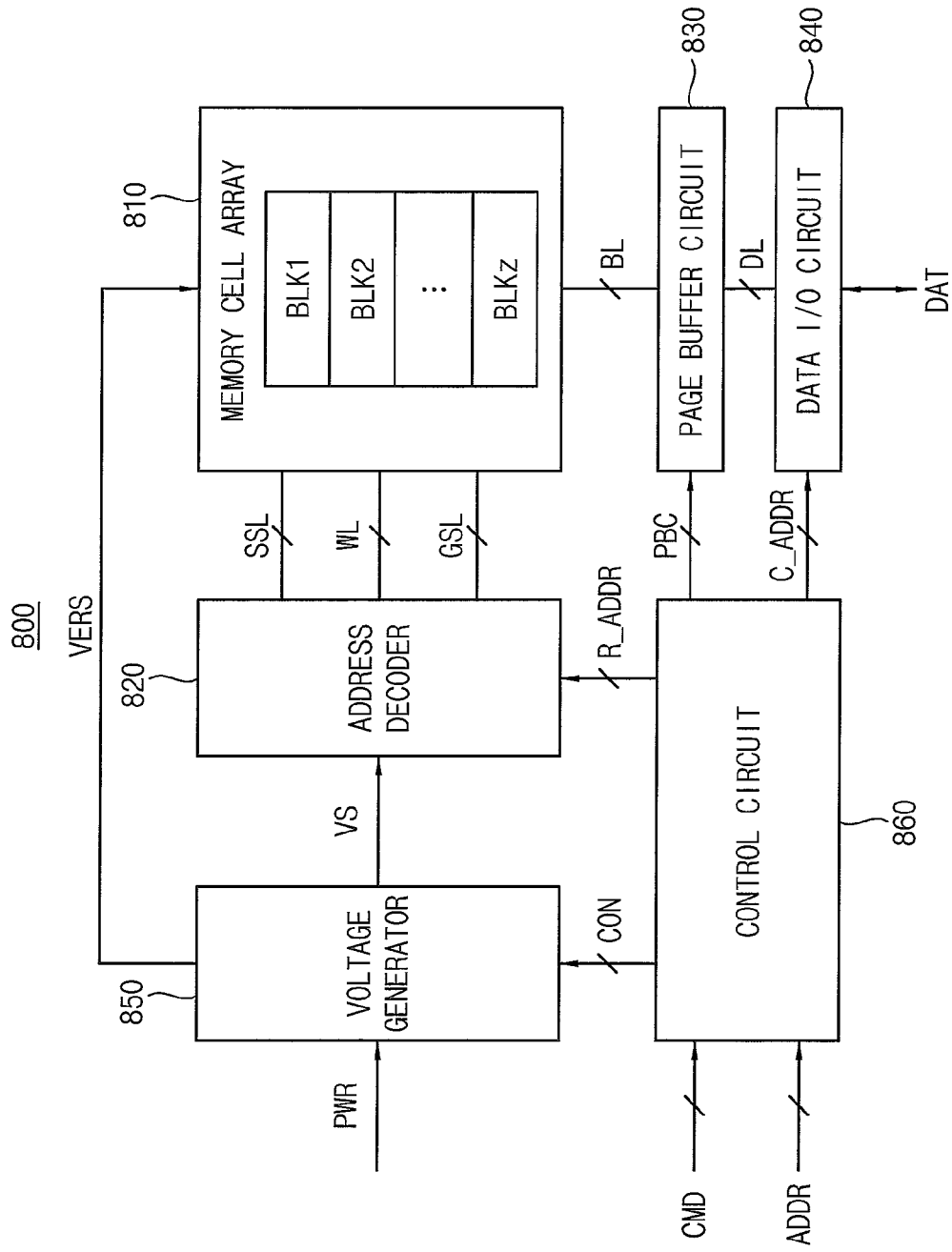
FIG. 5 is a block diagram illustrating an example of a memory device included in a memory chip included in a memory system according to example embodiments.

FIG. 5 is a block diagram illustrating an example of a memory device included in a memory chip included in a memory system according to example embodiments. The memory device illustrates in FIG. 5 may correspond to the memory devices 414, 424 illustrated din FIG. 2.

Referring to FIG. 5, a memory device 800 may include a memory cell array 810, an address decoder 820, a page buffer circuit 830, a data input/output (I/O) circuit 840, a voltage generator 850 and a control circuit 860. For example, the memory device 800 may be a nonvolatile memory device, in particular, a NAND flash memory device.

The memory cell array 810 is connected to the address decoder 820 via a plurality of string selection lines SSL, a plurality of wordlines WL and a plurality of ground selection lines GSL. The memory cell array 810 is further connected to the page buffer circuit 830 via a plurality of bitlines BL. The memory cell array 810 may include a plurality of memory cells (e.g., a plurality of nonvolatile memory cells) that are connected to the plurality of wordlines WL and the plurality of bitlines BL. The memory cell array 810 may be divided into a plurality of memory blocks BLK1, BLK2, . . . , BLKz each of which includes memory cells.

In some example embodiments, the plurality of memory cells may be arranged in a two dimensional (2D) array structure or a three dimensional (3D) vertical array structure. A three-dimensional vertical array structure may include vertical cell strings that are vertically oriented such that at least one memory cell is located over another memory cell. The at least one memory cell may comprise a charge trap layer. The following patent documents, which are hereby incorporated by reference in their entirety, describe suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and US Pat. Application Pub. No. 2011/0233648.

The control circuit 860 receives a command CMD and an address ADDR from the outside (e.g., from the memory controller 20 in FIG. 1), and control erasure, programming and read operations of the memory device 800 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recovery read operation.

For example, the control circuit 860 may generate control signals CON, which are used for controlling the voltage generator 850, and may generate control signal PBC for controlling the page buffer circuit 830, based on the command CMD, and may generate a row address R_ADDR and a column address C_ADDR based on the address ADDR. The control circuit 860 may provide the row address R_ADDR to the address decoder 820 and may provide the column address C_ADDR to the data I/O circuit 840.

The address decoder 820 may be connected to the memory cell array 810 via the plurality of string selection lines SSL, the plurality of wordlines WL and the plurality of ground selection lines GSL. For example, in the data erase/write/read operations, the address decoder 820 may determine at least one of the plurality of wordlines WL as a selected wordline, at least one of the plurality of string selection lines SSL as a selected string selection line, and at least one of the plurality of ground selection lines GSL as a selected ground selection line, based on the row address R_ADDR.

The voltage generator 850 may generate voltages VS that are required for an operation of the memory device 800 based on a power PWR and the control signals CON. The voltages VS may be applied to the plurality of string selection lines SSL, the plurality of wordlines WL and the plurality of ground selection lines GSL via the address decoder 820. In addition, the voltage generator 850 may generate an erase voltage VERS that is required for the data erase operation based on the power PWR and the control signals CON.

The page buffer circuit 830 may be connected to the memory cell array 810 via the plurality of bitlines BL. The page buffer circuit 830 may include a plurality of page buffers. The page buffer circuit 830 may store data DAT to be programmed into the memory cell array 810 or may read data DAT sensed from the memory cell array 810. In other words, the page buffer circuit 830 may operate as a write driver or a sensing amplifier according to an operation mode of the memory device 800.

The data I/O circuit 840 may be connected to the page buffer circuit 830 via data lines DL. The data I/O circuit 840 may provide the data DAT from the outside of the memory device 800 to the memory cell array 810 via the page buffer circuit 830 or may provide the data DAT from the memory cell array 810 to the outside of the nonvolatile memory 800, based on the column address C_ADDR.

Although the memory device included in the memory system according to example embodiments illustrated in FIG. 5 is described based on a NAND flash memory device, the memory device according to example embodiments may be any nonvolatile memory device, e.g., a phase random access memory (PRAM), a resistive random access memory (RRAM), a nano floating gate memory (NFGM), a polymer random access memory (PoRAM), a magnetic random access memory (MRAM), a ferroelectric random access memory (FRAM), a thyristor random access memory (TRAM), etc., and/or any volatile memory device, e.g., a dynamic random access memory (DRAM), etc.

FIGS. 6A, 6B, 6C and 6D are diagrams for describing a first data signal transmitted through a first channel included in the memory system of FIG. 2.

Figure 6A:
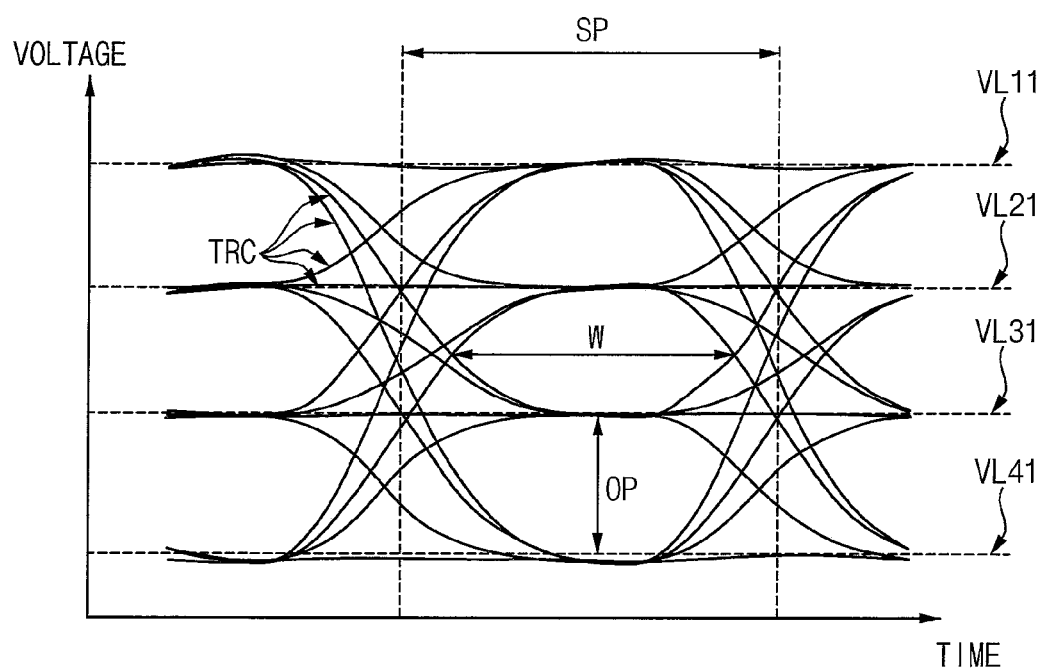
FIGS. 6A, 6B, 6C and 6D are diagrams for describing a first data signal transmitted through a first channel included in the memory system of FIG. 2.
Figure 6B:
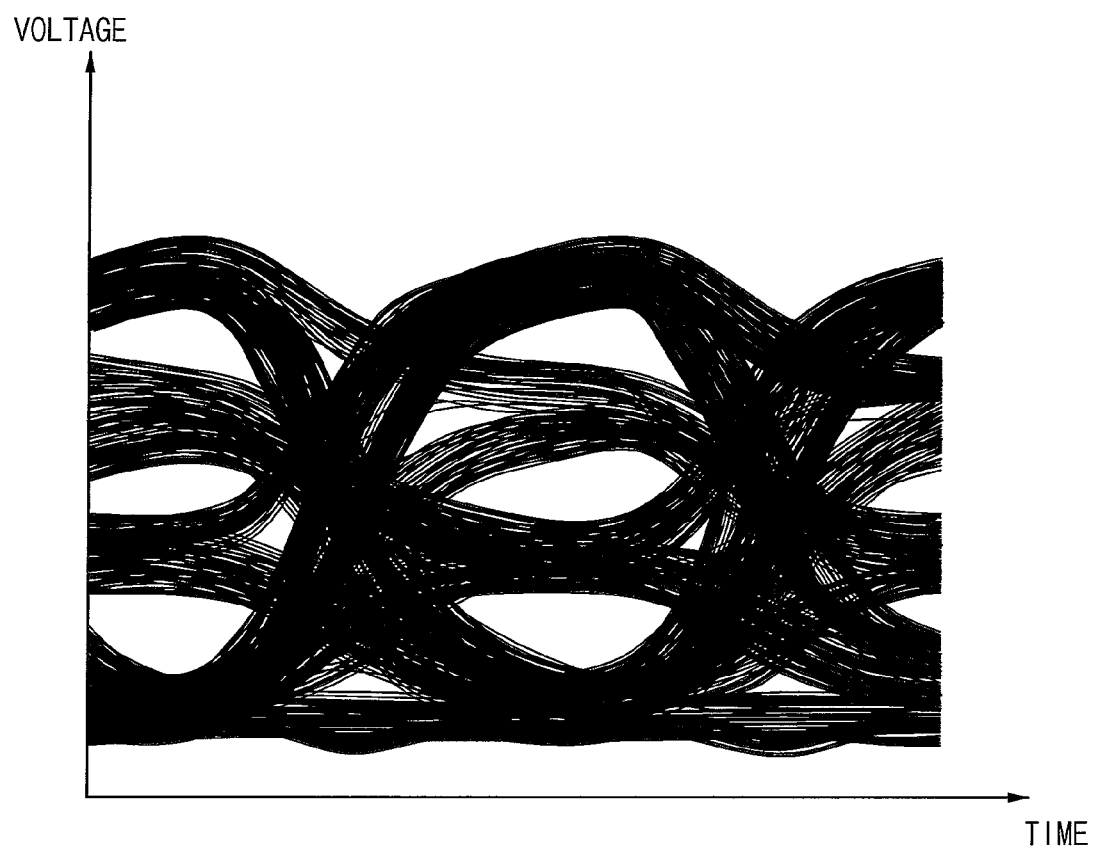
Figures 6C, 6D:
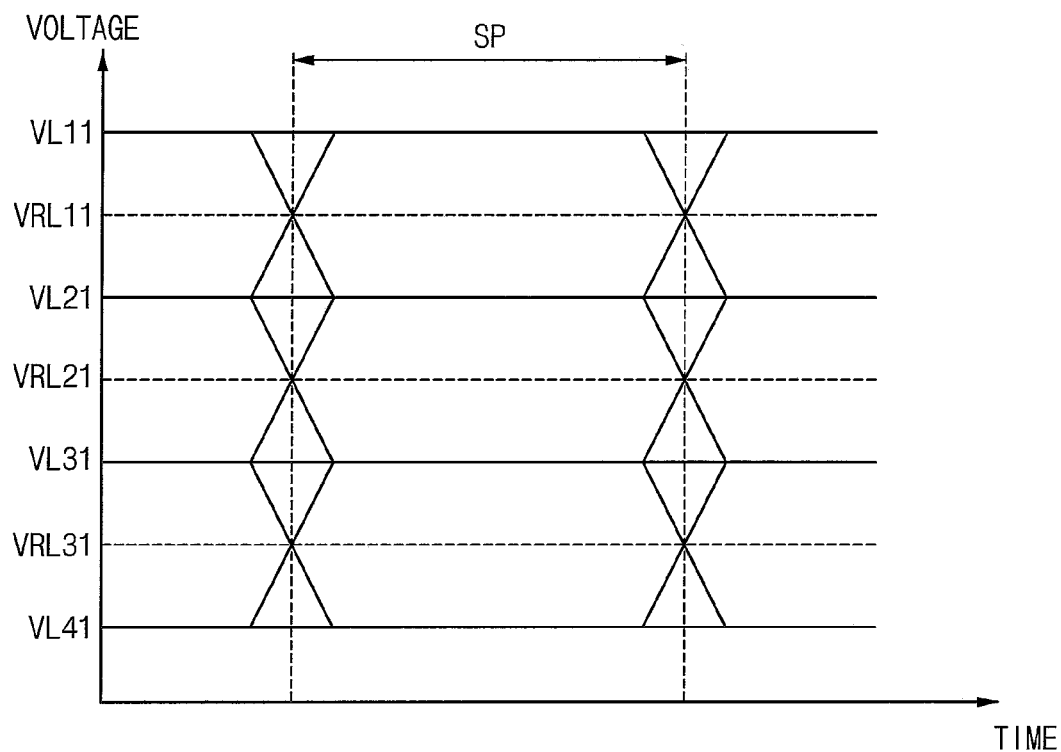

FIG. 6A illustrates an ideal eye diagram of the first data signal DS11 in FIG. 2. FIG. 6B illustrates an eye diagram obtained by actually simulating the first data signal DS11 in FIG. 2. FIG. 6C is a simplified diagram illustrating the ideal eye diagram of FIG. 6A. FIG. 6D illustrates an example configuration of the first data DAT11 represented by the first data signal DS11.

Referring to FIGS. 6A and 6B, an eye diagram may be used to indicate the quality of signals in high-speed transmissions. For example, the eye diagram may represent the first data signal DS11, e.g., a PAM4 signal, used to communicate data in the memory system 100a. For example, the eye diagram may represent four symbols of a signal (e.g., '00,' '01,' '10' and '11'), and each of the four symbols may be represented by a respective one of different voltage levels (e.g., voltage amplitudes) VL11, VL21, VL31 and VL41. The eye diagram may be used to provide a visual indication of the health of the signal integrity, and may indicate noise margins of the data signal.

To generate the eye diagram, an oscilloscope or other computing device may sample a digital signal according to a sample period SP (e.g., a unit interval or a bit period). The sample period SP may be defined by a clock associated with the transmission of the measured signal. The oscilloscope or other computing device may measure the voltage level of the signal during the sample period SP to form the plurality of traces TRC. Various characteristics associated with the measured signal may be determined by overlaying the plurality of traces TRC.

The eye diagram may be used to identify a number of characteristics of a communication signal such as jitter, cross talk, electromagnetic interference (EMI), signal loss, signal-to-noise ratio (SNR), other characteristics, or combinations thereof. For example, a width W of an eye in the eye diagram may be used to indicate a timing synchronization of the measured signal or jitter effects of the measured signal. For example, the eye diagram 200 may indicate an eye opening OP, which represents a peak-to-peak voltage difference between the various voltage levels VL11, VL21, VL31 and VL41. The eye opening OP may be related to a voltage margin for discriminating between different voltage levels VL11, VL21, VL31 and VL41 of the measured signal.

Referring to FIG. 6C, different first, second, third and fourth voltage levels VL11, VL21, VL31 and VL41 of first data signal DS11 that is the PAM4 signal are illustrated, and different first, second and third reference voltage levels VRL11, VRL21 and VRL31 for detecting or sensing the voltage levels VL11, VL21, VL31 and VL41 are illustrated.

The first voltage level VL11 may be higher than the second voltage level VL21, the second voltage level VL21 may be higher than the third voltage level VL31, and the third voltage level VL31 may be higher than the fourth voltage level VL41. For example, the first voltage level VL11 may be substantially equal to a level of a power supply voltage VDDQ, the second voltage level VL21 may be about ⅔ of the level of the power supply voltage VDDQ, the third voltage level VL31 may be about ⅓ of the level of the power supply voltage VDDQ, and the fourth voltage level VL41 may be a level of a ground voltage GND (e.g., about 0V).

The first reference voltage level VRL11 may be a level between the first voltage level VL11 and the second voltage level VL21, the second reference voltage level VRL21 may be a level between the second voltage level VL21 and the third voltage level VL31, and the third reference voltage level VRL31 may be a level between the third voltage level VL31 and the fourth voltage level VL41. For example, the first reference voltage level VRL11 may be about ¾ of the level of the power supply voltage VDDQ, the second reference voltage level VRL21 may be about ½ of the level of the power supply voltage VDDQ, and the third reference voltage level VRL31 may be about ¼ of the level of the power voltage VDDQ.

Referring to FIG. 6D, a relationship between the different first, second, third and fourth voltage levels VL11, VL21, VL31 and VL41 of the first data signal DS11 and values of the different first and second bits B11 and B21 included in the first data DAT11 is illustrated.

When the first data DAT11 has a value of '11,' e.g., when each of the value of the first bit B11 and the value of the second bit B21 is '1,' the first data signal DS11 generated based on the first data DAT11 may have the first voltage level VL11. Similarly, when the first data DAT11 has a value of '10,' the first data signal DS11 may have the second voltage level VL21. When the first data DAT11 has a value of '01,' the first data signal DS11 may have the third voltage level VL31. When the first data DAT11 has a value of '00,' the first data signal DS11 may have the fourth voltage level VL41.

In the example of FIG. 6D, the first bit B11 may be a most significant bit (MSB) of the first data DAT11, and the second bit B21 may be a least significant bit (LSB) of the first data DAT11, but example embodiments are not limited thereto.

Figure 7:
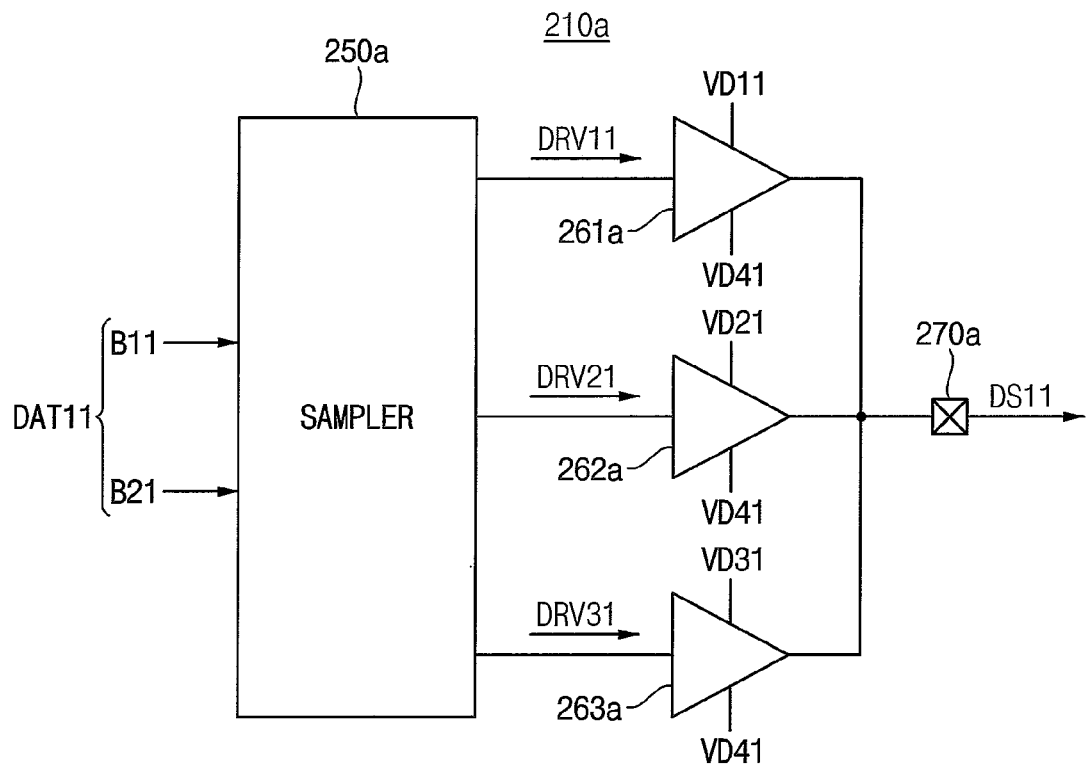
FIG. 7 is a block diagram illustrating an example of a data driving circuit included in a memory controller included in the memory system of FIG. 2.

FIG. 7 is a block diagram illustrating an example of a data driving circuit included in a memory controller included in the memory system of FIG. 2, according to an example embodiment.

Referring to FIG. 7, the data driving circuit (ML_DRV) 210a may generate the first data signal DS11 having one of the first, second, third and fourth voltage levels VL11, VL21, VL31 and VL41 based on the value of the first bit B11 and the value of the second bit B21 included in the first data DAT11.

The data driving circuit 210a may include a sampler 250a, a first driver 261a, a second driver 262a, a third driver 263a and a data I/O pad 270a.

The sampler 250a may generate a first driving signal DRV11, a second driving signal DRV21 and a third driving signal DRV31 based on the value of the first bit B11 and the value of the second bit B21.

The first driver 261a may generate the first data signal DS11 having the first voltage level VL11 or the fourth voltage level VL41 based on the first driving signal DRV11. The second driver 262a may generate the first data signal DS11 having the second voltage level VL21 or the fourth voltage level VL41 based on the second driving signal DRV21. The third driver 263a may generate the first data signal DS11 having the third voltage level VL31 or the fourth voltage level VL41 based on the third driving signal DRV31.

In some example embodiments, each of the first, second and third drivers 261a, 262a and 263a may include a complementary metal-oxide semiconductor (CMOS) gate. For example, the first driver 261a may include a first CMOS gate that operates based on a first driving voltage VD11 having the first voltage level VL11 and a fourth driving voltage VD41 having the fourth voltage level VL41. The second driver 262a may include a second CMOS gate that operates based on a second driving voltage VD21 having the second voltage level VL21 and the fourth driving voltage VD41. The third driver 263a may include a third CMOS gate that operates based on a third driving voltage VD31 having the third voltage level VL31 and the fourth driving voltage VD41.

When the first data DAT11 has the value of '11,' the first driving signal DRV11 may have a logic high level, the first driver 261a may generate the first data signal DS11 having the first voltage level VL11 based on the first driving signal DRV11, and the second and third drivers 262a and 263a may be disabled or deactivated. Similarly, when the first data DAT11 has the value of '10,' the second driving signal DRV21 may have the logic high level, the second driver 262a may generate the first data signal DS11 having the second voltage level VL21 based on the second driving signal DRV21, and the first and third drivers 261a and 263a may be disabled. When the first data DAT11 has the value of '01,' the third driving signal DRV31 may have the logic high level, the third driver 263a may generate the first data signal DS11 having the third voltage level VL31 based on the third driving signal DRV31, and the first and second drivers 261a and 262a may be disabled.

When the first data DAT11 has the value of '00,' at least one of the first, second and third driving signals DRV11, DRV21 and DRV31 may have a logic low level, and at least one of the first, second and third drivers 261a, 262a and 263a may generate the first data signal DS11 having the fourth voltage level VL41 based on at least one of the first, second and third driving signals DRV11, DRV21 and DRV31.

The data I/O pad 270a may output the first data signal DS11. For example, a pad may be a contact pad or a contact pin, but example embodiments are not limited thereto.

Figure 8:
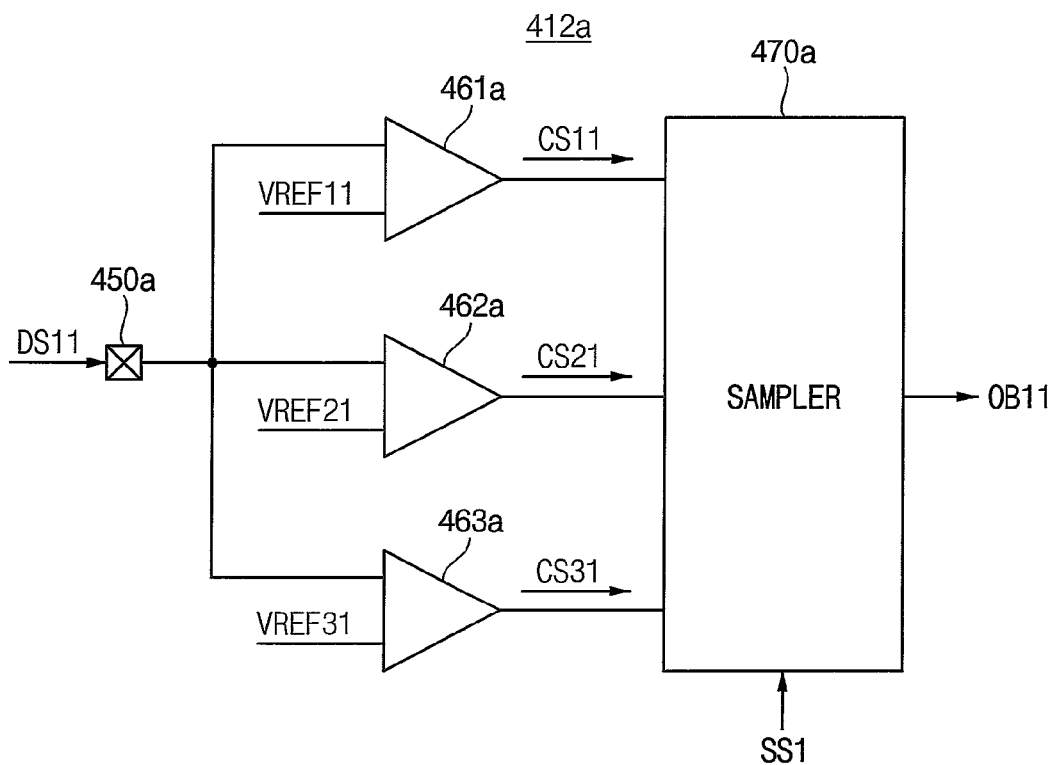
FIG. 8 is a block diagram illustrating an example of a first data receiving circuit included in a first memory chip included in the memory system of FIG. 2.

FIG. 8 is a block diagram illustrating an example of a first data receiving circuit included in a first memory chip included in the memory system of FIG. 2, according to an example embodiment.

Referring to FIG. 8, the first data receiving circuit (ML_RCV) 412a may obtain a value of a first bit OB11 based on the first sensing setting signal SS1 and the first, second and third reference voltage levels VRL11, VRL21 and VRL31.

The first data receiving circuit 412a may include a data I/O pad 450a, a first comparator 461a, a second comparator 462a, a third comparator 463a and a sampler 470a.

The data I/O pad 450a may receive the first data signal DS11.

The first comparator 461a may generate a first comparison signal CS11 by comparing a voltage level of the first data signal DS11 with the first reference voltage level VRL11. The second comparator 462a may generate a second comparison signal CS21 by comparing the voltage level of the first data signal DS11 with the second reference voltage level VRL21. The third comparator 463a may generate a third comparison signal CS31 by comparing the voltage level of the first data signal DS11 with the third reference voltage level VRL31.

In some example embodiments, each of the first, second and third comparators 461a, 462a, and 463a may include an operational amplifier. For example, the first comparator 461a may include a first operational amplifier that operates based on the first data signal DS11 and a first reference voltage VREF11 having the first reference voltage level VRL11. The second comparator 462a may include a second operational amplifier that operates based on the first data signal DS11 and a second reference voltage VREF21 having the second reference voltage level VRL21. The third comparator 463a may include a third operational amplifier that operates based on the first data signal DS11 and a third reference voltage VREF31 having the third reference voltage level VRL31.

The sampler 470a may obtain the value of the first bit OB11 based on the first sensing setting signal SS1 and at least one of the first, second and third comparison signals CS11, CS21 and CS31. The value of the first bit OB11 obtained by the sampler 470a may be substantially equal to the value of the first bit B11 input to the data driving circuit 210a.

In some example embodiments, when the sampler 470a is set to obtain the MSB of the first data DAT11, the sampler 470a may obtain the value of the first bit OB11 using only the second comparison signal CS21 among the first, second and third comparison signals CS11, CS21 and CS31. For example, as illustrated in FIG. 6D, the first bit B11 may be the MSB of the first data DAT11, the first data signal DS11 may have one of the first and second voltage levels VL11 and VL21 when the value of the first bit B11 is '1,' and the first data signal DS11 may have one of the third and fourth voltage levels VL31 and VL41 when the value of the first bit B11 is '0.' Thus, when it is determined, based on the second comparison signal CS21, that the voltage level of the first data signal DS11 is higher than the second reference voltage level VRL21, the sampler 470a may obtain the first bit OB11 having a value of '1.' When it is determined, based on the second comparison signal CS21, that the voltage level of the first data signal DS11 is lower than the second reference voltage level VRL21, the sampler 470a may obtain the first bit OB11 having a value of '0.'

Although not illustrated in FIG. 8, the second data receiving circuit 422a included in the second memory chip 420a may be substantially the same as the first data receiving circuit 412a of FIG. 8, except that the first sensing setting signal SS1 and the first bit OB11 in FIG. 8 are changed to the second sensing setting signal SS2 and a second bit OB21, respectively.

In some example embodiments, when a sampler included in the second data receiving circuit 422a is set to obtain the LSB of the first data DAT11, the sampler may obtain a value of the second bit OB21 using the second comparison signal CS21 and one of the first and third comparison signals CS11 and CS31 among the first, second and third comparison signals CS11, CS21 and CS31. For example, as illustrated in FIG. 6D, the second bit B21 may be the LSB of the first data DAT11, the first data signal DS11 may have one of the first and third voltage levels VL11 and VL31 when the value of the second bit B21 is '1,' and the first data signal DS11 may have one of the second and fourth voltage levels VL21 and VL41 when the value of the second bit B21 is '0.' Thus, the sampler may first determine, based on the second comparison signal CS21, whether the voltage level of the first data signal DS11 is higher or lower than the second reference voltage level VRL21. In a first case where the level of the first data signal DS11 is higher than the second reference level VRL21, when it is determined, based on the first comparison signal CS11, that the voltage level of the first data signal DS11 is higher than the first reference voltage level VRL11, the sampler may obtain the second bit OB21 having a value of '1.' In the first case, when it is determined, based on the first comparison signal CS11, that the voltage level of the first data signal DS11 is lower than the first reference voltage level VRL11, the sampler may obtain the second bit OB21 having a value of '0.' Similarly, in a second case where the level of the first data signal DS11 is lower than the second reference level VRL21, when it is determined, based on the third comparison signal CS31, that the voltage level of the first data signal DS11 is higher than the third reference voltage level VRL31, the sampler may obtain the second bit OB21 having a value of '1.' In the second case, when it is determined, based on the third comparison signal CS31, that the voltage level of the first data signal DS11 is lower than the third reference voltage level VRL31, the sampler may obtain the second bit OB21 having a value of '0.'

Figure 9:
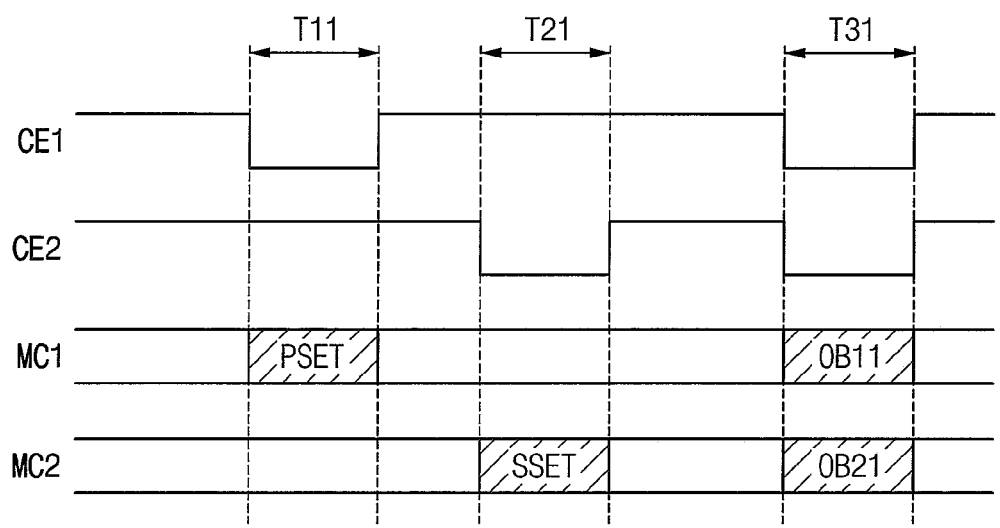
FIGS. 9, 10A and 10B are diagrams for describing an operation of the memory system of FIG. 2.
Figure 10A:
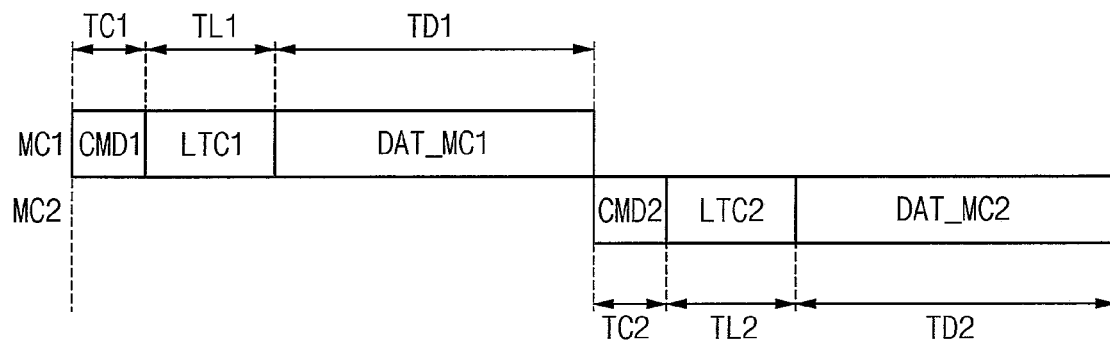
Figure 10B:
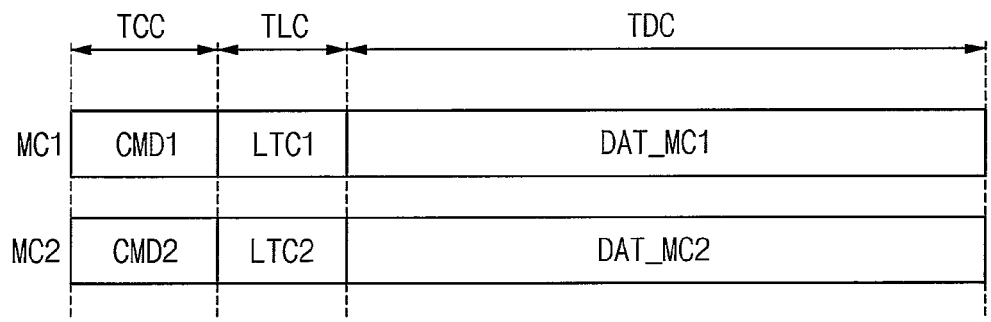

FIGS. 9, 10A and 10B are diagrams for describing an operation of the memory system of FIG. 2, according to example embodiments.

Referring to FIG. 9, an operation according to example embodiments in which the memory controller 200a transmits the first data signal DS11 based on the PAM4 scheme to the first and second memory chips 410a and 420a is illustrated.

First, during a time interval T11, only the first memory chip 410a may be enabled by activating only the first chip enable signal CE1, and a first setting operation PSET may be performed on the first memory chip 410a based on the first sensing setting signal SS1. For example, the first setting operation PSET may be an operation in which the first memory chip 410a is set to obtain the first bit B11 that is the MSB of the first data DAT11 based on the first data signal DS11. The first setting operation PSET may be referred to as a primary setting operation.

Next, during a time interval T21, only the second memory chip 420a may be enabled by activating only the second chip enable signal CE2, and a second setting operation SSET may be performed on the second memory chip 420a based on the second sensing setting signal SS2. For example, the second setting operation SSET may be an operation in which the second memory chip 420a is set to obtain the second bit B21 that is the LSB of the first data DAT11 based on the first data signal DS11. The second setting operation SSET may be referred to as a secondary setting operation.

After that, during a time interval T31, the first and second memory chips 410a and 420a may be simultaneously enabled by activating both the first and second chip enable signals CE1 and CE2, and the memory controller 200a may generate and output the first data signal DS11. While both the first and second memory chips 410a and 420a have the enabled state, the first and second memory chips 410a and 420a may simultaneously receive the first data signal DS11, may simultaneously obtain the first and second bits OB11 and OB21, and may operate based on the first and second bits OB11 and OB21. For example, the first and second bits OB11 and OB21 may be simultaneously written into one of the first memory devices 414 included in the first memory chip 410a and one of the second memory devices 424 included in the second memory chip 420a.

Although example embodiments are described based on an example where the first data signal DS11 includes a single first data DAT11, example embodiments are not limited thereto. For example, the first data signal DS11 may sequentially and continuously provide a plurality of data based on a predetermined data transmission rate, and the first and second memory chips 410a and 420a may simultaneously obtain and write a plurality of first bits and a plurality of second bits during the time interval T31.

Referring to FIG. 10A, a data write operation on first and second memory chips MC1 and MC2 that are commonly connected to the same channel is illustrated. In FIG. 10A, the first memory chip MC1 is enabled and performs the data write operation first, and then the second memory chip MC2 is enabled and performs the data write operation. In other words, FIG. 10A illustrates a related art data write scheme. In FIG. 10A, the first and second memory chips MC1 and MC2 operate based on a first data transmission rate. The first memory chip MC1 requires a transmission time TC1 for a command CMD1, a time TL1 for a latency LTC1 and a transmission time TD1 for data DAT MC1. The second memory chip MC2 requires a transmission time TC2 for a command CMD2, a time TL2 for a latency LTC2 and a transmission time TD2 for data DAT MC2.

Referring to FIG. 10B, a data write operation on first and second memory chips MC1 and MC2 that are commonly connected to the same channel is illustrated. In FIG. 10B, the first and second memory chips MC1 and MC2 may simultaneously perform the data write operation while both the first and second memory chips MC1 and MC2 have the enabled state. In other words, FIG. 10B illustrates a data write scheme according to example embodiments. In FIG. 10B, the first and second memory chips MC1 and MC2 may operate based on a second data transmission rate lower than the first data transmission rate (e.g., which is a half of the first data transmission rate). The first memory chip MC1 may require a transmission time TCC for a command CMD1, a time TLC for a latency LTC1 and a transmission time TDC for data DAT MC1. The second memory chip MC2 may require the transmission time TCC for a command CMD2, the time TLC for a latency LTC2 and the transmission time TDC for data DAT MC2. In other words, the transmission time TCC is for both the command CMD1 and the command CMD2, the time TLC is for both the latency LTC1 and the latency LTC2, and the transmission time TDC is for both the data DAT MC1 and the data DAT MC2.

As illustrated in FIGS. 10A and 10B, although a time required for the data write operation on one memory chip is shorter in the case of FIG. 10A than in the case of FIG. 10B, the total time required for the data write operation on both of two memory chips may be shorter in the case of FIG. 10B than in the case of FIG. 10A. Accordingly, when the 2-chip simultaneous operation (or 2-way simultaneous operation) is performed according to example embodiments, the performance of the entire memory system may be improved or enhanced.

Figure 11:
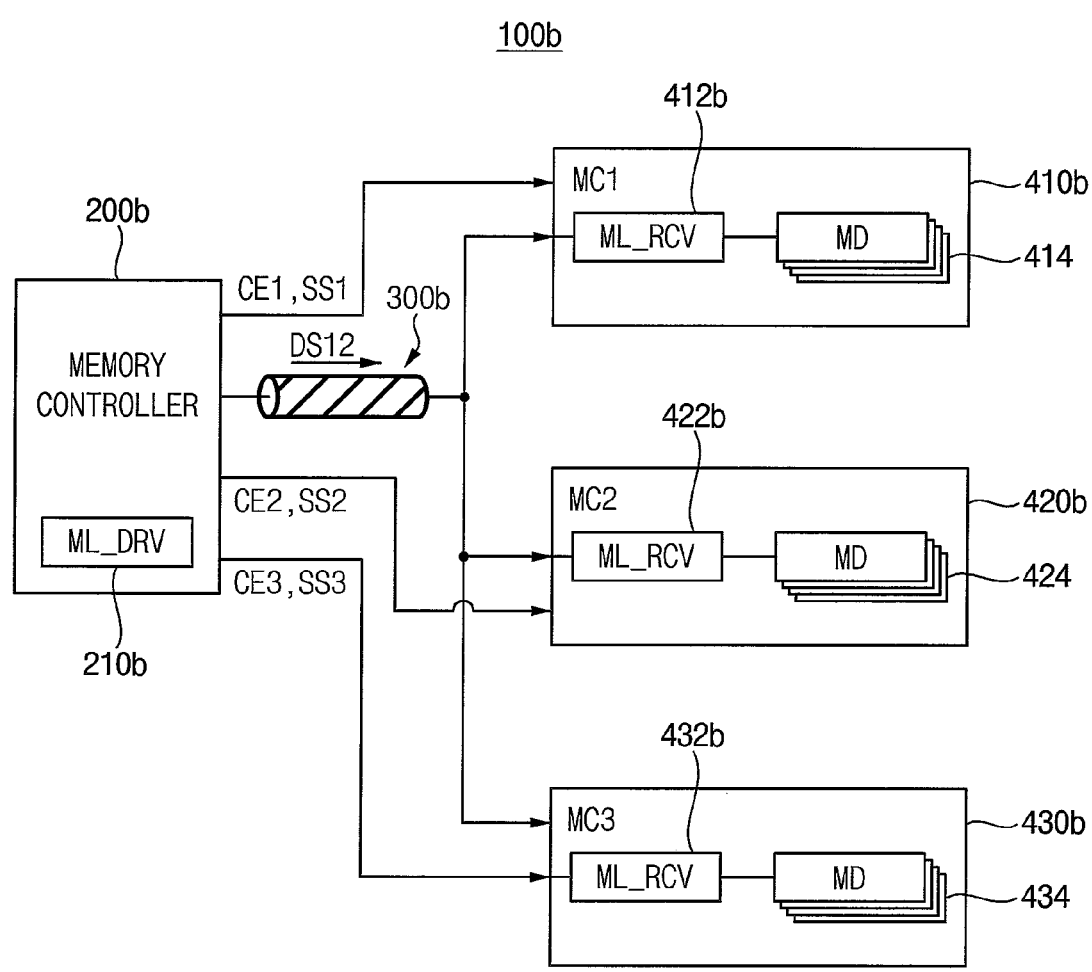
FIG. 11 is a block diagram illustrating another example of the memory system of FIG. 1, according to an example embodiment.

FIG. 11 is a block diagram illustrating another example of the memory system of FIG. 1. The descriptions repeated with FIG. 2 will be omitted for conciseness.

Referring to FIG. 11, a memory system 100b includes a memory controller 200b, a first channel 300b, a first memory chip 410b, a second memory chip 420b and a third memory chip 430b. FIG. 11 illustrates an example of the memory system 10 of FIG. 1 where M is 3 and a data signal is generated based on the 8-level scheme (e.g., the PAM8 scheme).

The memory controller 200b generates a first data signal DS12 having one of eight voltage levels, and outputs the first data signal DS12 through the first channel 300b. The first data signal DS12 represents first data including three bits. As will be described with reference to FIGS. 12A and 12B, the first data signal DS12 may have one of a first voltage level VL12, a second voltage level VL22, a third voltage level VL32, a fourth voltage level VL42, a fifth voltage level VL52, a sixth voltage level VL62, a seventh voltage level VL72 and an eighth voltage level VL82 that are different from each other, and the first data DAT12 may include a first bit B12, a and second bit B22 and a third bit B32.

The memory controller 200b may include a data driving circuit (ML_DRV) 210b that generates the first data signal DS12. An example configuration of the data driving circuit 210b will be described with reference to FIG. 13. The memory controller 200b may generate first, second and third enable signals CE1, CE2 and CE3, and first, second and third sensing setting signals SS1, SS2 and SS3, may provide the first chip enable signal CE1 and the first sensing setting signal SS1 to the first memory chip 410b, may provide the second chip enable signal CE2 and the second sensing setting signal SS2 to the second memory chip 420b, and may provide the third chip enable signal CE3 and the third sensing setting signal SS3 to the third memory chip 430b.

The first, second and third memory chips 410b, 420b and 430b are commonly connected to the memory controller 200b through the first channel 300b, are enabled based on the first, second and third enable signals CE1, CE2 and CE3, respectively, and simultaneously receive the first data signal DS12 transmitted from the memory controller 200b through the first channel 300b when the first, second and third memory chips 410b, 420b and 430b have an enabled state. The first memory chip 410b may obtain the first bit B12 based on the first data signal DS12, and may operate based on the first bit B12. The second memory chip 420b may obtain the second bit B22 based on the first data signal DS12, and may operate based on the second bit B22. The third memory chip 430b may obtain the third bit B32 based on the first data signal DS12, and may operate based on the third bit B32. The first, second and third memory chips 410*b*, 420*b* and 430*b* may simultaneously obtain the first, second and third bits B12, B22 and B32.

The first memory chip 410*b* may include a first data receiving circuit (ML_RCV) 412*b* and a plurality of first memory devices 414. The first data receiving circuit 412*b* may obtain the first bit B12 based on the first data signal DS12. An example configuration of the first data receiving circuit 412*b* will be described with reference to FIG. 14. The second memory chip 420*b* may include a second data receiving circuit (ML_RCV) 422*b* and a plurality of second memory devices 424. The second data receiving circuit 422*b* may obtain the second bit B22 based on the first data signal DS12. The third memory chip 430*b* may include a third data receiving circuit (ML_RCV) 432*b* and a plurality of third memory devices 434. The third data receiving circuit 432*b* may obtain the third bit B32 based on the first data signal DS12.

Figure 12A:
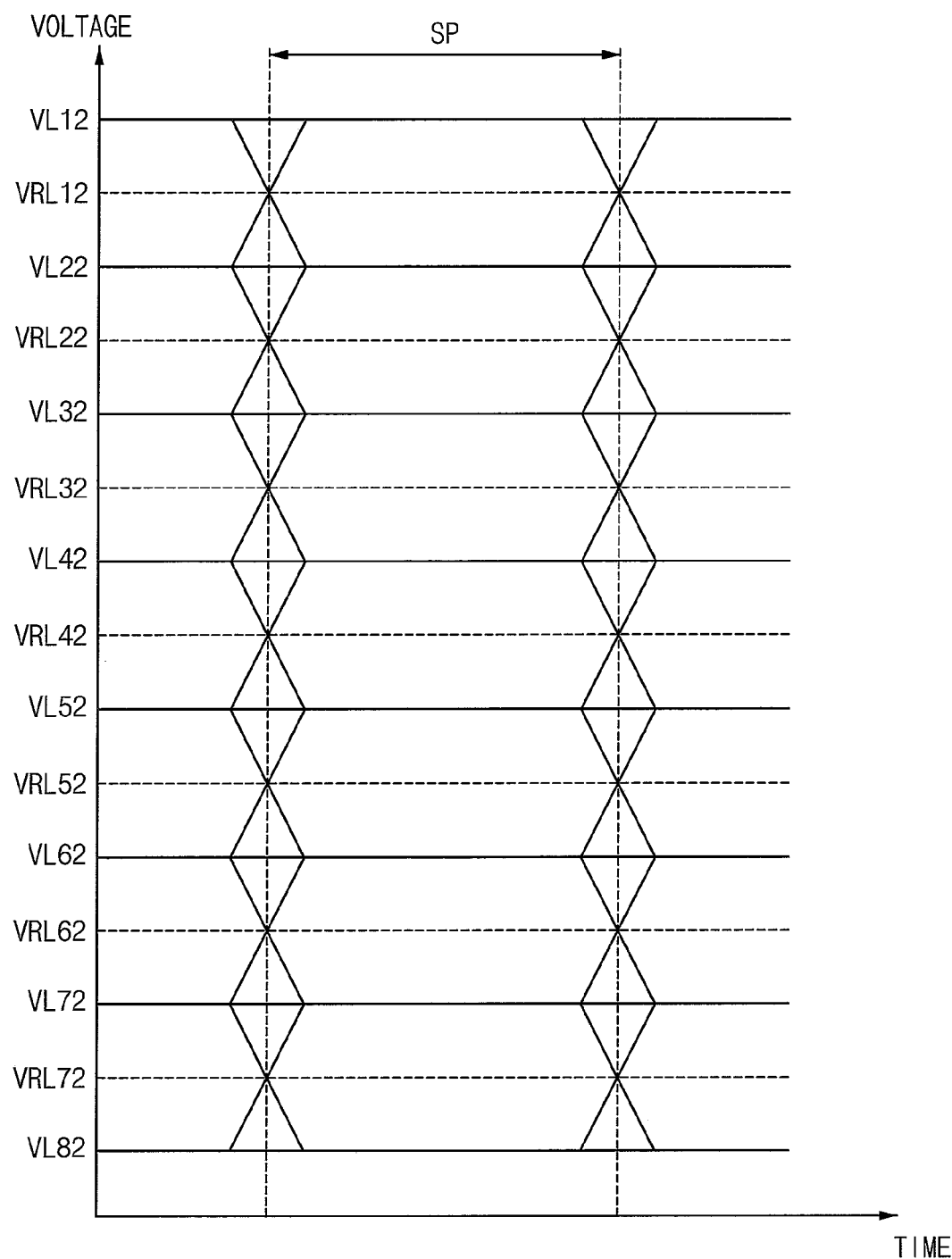

FIGS. 12A and 12B are diagrams for describing a first data signal transmitted through a first channel included in the memory system of FIG. 11. The descriptions repeated with FIGS. 6C and 6D will be omitted for conciseness.

Referring to FIG. 12A, different first, second, third, fourth, fifth, sixth, seventh and eighth voltage levels VL12, VL22, VL32, VL42, VL52, VL62, VL72 and VL82 of the first data signal DS12 that is the PAM8 signal are illustrated, and different first, second, third, fourth, fifth, sixth and seventh reference voltage levels VRL12, VRL22, VRL32, VRL42, VRL52, VRL62 and VRL72 for detecting the voltage levels VL12, VL22, VL32, VL42, VL52, VL62, VL72 and VL82 are illustrated. A relationship between the voltage levels and the reference voltage levels may be as illustrated in FIG. 12A.

Referring to FIG. 12B, a relationship between the different first, second, third, fourth, fifth, sixth, seventh and eighth voltage levels VL12, VL22, VL32, VL42, VL52, VL62, VL72 and VL82 of the first data signal DS12 and values of the different first, second and third bits B12, B22 and B32 included in the first data DAT12 is illustrated. The relationship between the values of the first data DAT12 and the voltage levels of the first data signal DS12 may be as illustrated in FIG. 12B.

Figure 13:
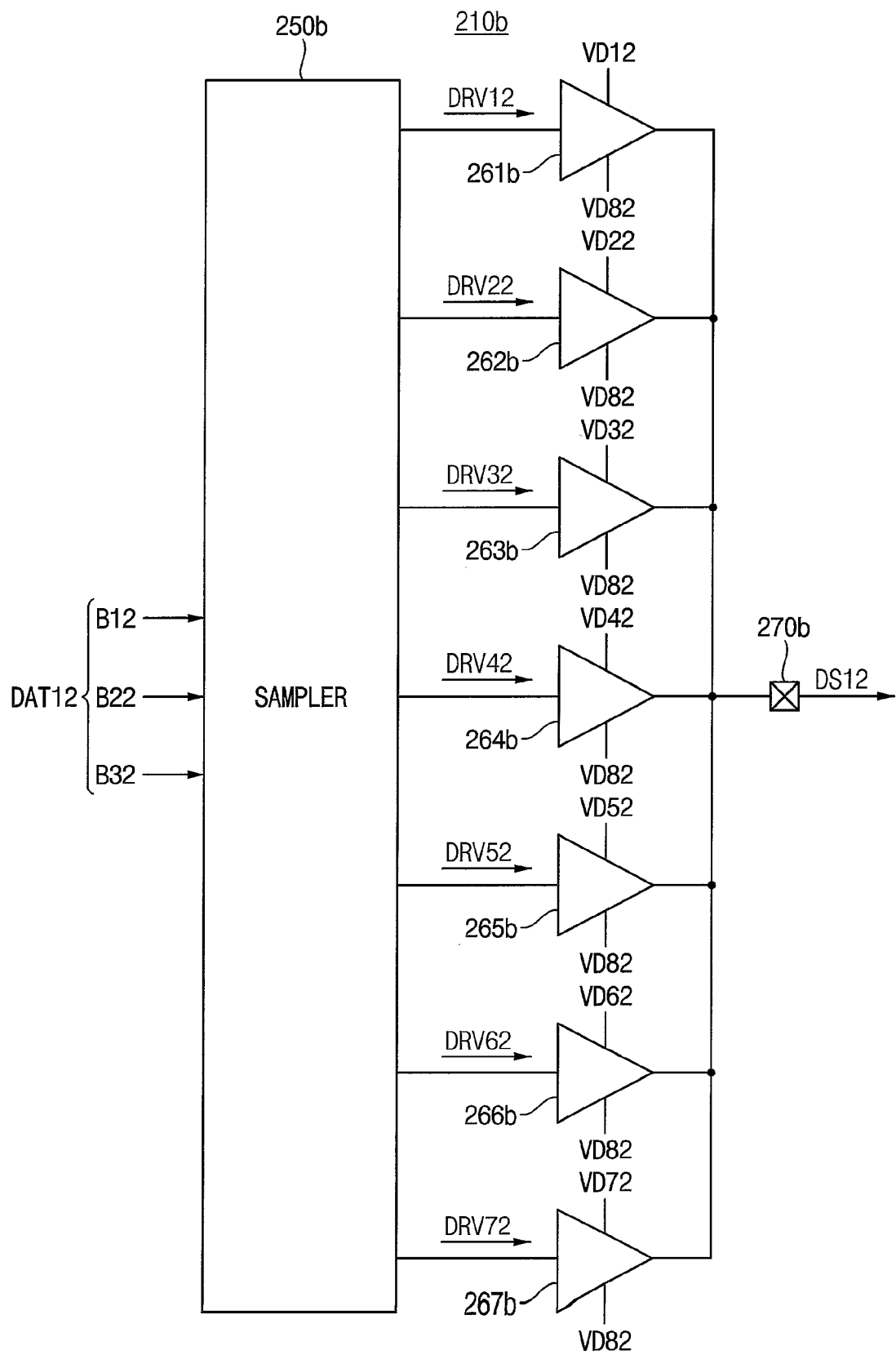
FIG. 13 is a block diagram illustrating an example of a data driving circuit included in a memory controller included in the memory system of FIG. 11.

FIG. 13 is a block diagram illustrating an example of a data driving circuit included in a memory controller included in the memory system of FIG. 11. The descriptions repeated with FIG. 7 will be omitted for conciseness.

Referring to FIG. 13, the data driving circuit (ML_DRV) 210*b* may generate the first data signal DS12 having one of the first, second, third, fourth, fifth, sixth, seventh and eighth voltage levels VL12, VL22, VL32, VL42, VL52, VL62, VL72 and VL82 based on the values of the first, second and third bits B12, B22 and B32 included in the first data DAT12.

The data driving circuit 210*b* may include a sampler 250*b*, a first driver 261*b*, a second driver 262*b*, a third driver 263*b*, a fourth driver 264*b*, a fifth driver 265*b*, a sixth driver 266*b*, a seventh driver 267*b* and a data I/O pad 270*b*.

The sampler 250*a* may generate first, second, third, fourth, fifth, sixth and seventh driving signals DRV12, DRV22, DRV32, DRV42, DRV52, DRV62 and DRV72 based on the values of the first, second and third bits B12, B22 and B32.

The first driver 261*b* may generate the first data signal DS12 having the first voltage level VL12 or the eighth voltage level VL82 based on the first driving signal DRV12. The second driver 262*b* may generate the first data signal DS12 having the second voltage level VL22 or the eighth voltage level VL82 based on the second driving signal DRV22. The third driver 263*b* may generate the first data signal DS12 having the third voltage level VL32 or the eighth voltage level VL82 based on the third driving signal DRV32. The fourth driver 264*b* may generate the first data signal DS12 having the fourth voltage level VL42 or the eighth voltage level VL82 based on the fourth driving signal DRV42. The fifth driver 265*b* may generate the first data signal DS12 having the fifth voltage level VL52 or the eighth voltage level VL82 based on the fifth driving signal DRV52. The sixth driver 266*b* may generate the first data signal DS12 having the sixth voltage level VL62 or the eighth voltage level VL82 based on the sixth driving signal DRV62. The seventh driver 267*b* may generate the first data signal DS12 having the seventh voltage level VL72 or the eighth voltage level VL82 based on the seventh driving signal DRV72. The first, second, third, fourth, fifth, sixth and seventh drivers 261*b*, 262*b*, 263*b*, 264*b*, 265*b*, 266*b* and 267*b* may operate based on first, second, third, fourth, fifth, sixth, seventh and eighth driving voltages VD12, VD22, VD32, VD42, VD52, VD62, VD72 and VD82 having the first, second, third, fourth, fifth, sixth, seventh and eighth voltage levels VL12, VL22, VL32, VL42, VL52, VL62, VL72 and VL82, respectively.

The data I/O pad 270*b* may output the first data signal DS12.

Figure 14:
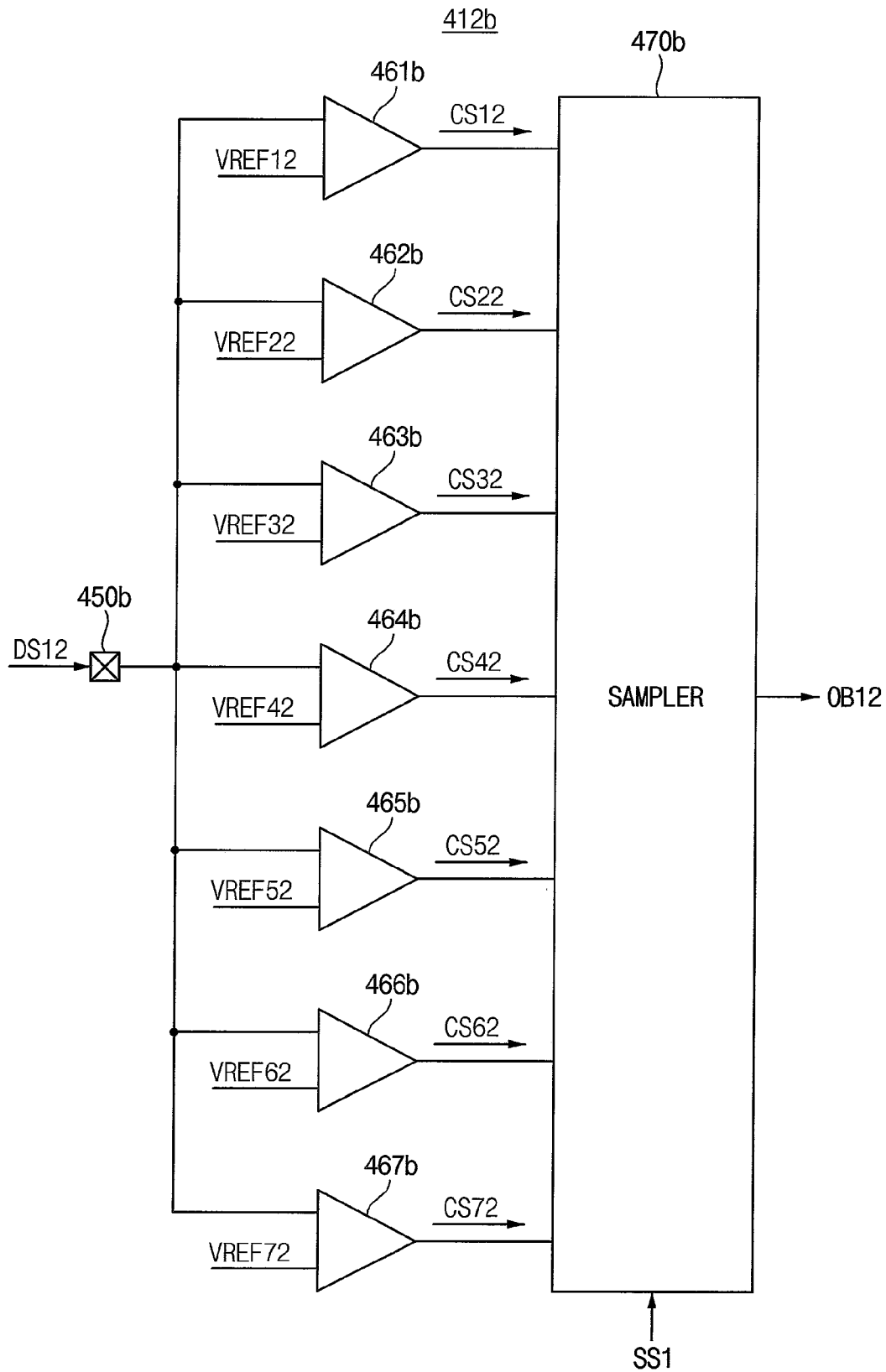
FIG. 14 is a block diagram illustrating an example of a first data receiving circuit included in a first memory chip included in the memory system of FIG. 11.

FIG. 14 is a block diagram illustrating an example of a first data receiving circuit included in a first memory chip included in the memory system of FIG. 11. The descriptions repeated with FIG. 8 will be omitted for conciseness.

Referring to FIG. 14, the first data receiving circuit (ML_RCV) 412*b* may obtain a value of a first bit OB12 based on the first sensing setting signal SS1 and the first, second, third, fourth, fifth, sixth and seventh reference voltage levels VRL12, VRL22, VRL32, VRL42, VRL52, VRL62 and VRL72.

The first data receiving circuit 412*b* may include a data I/O pad 450*b*, a first comparator 461*b*, a second comparator 462*b*, a third comparator 463*b*, a fourth comparator 464*b*, a fifth comparator 465*b*, a sixth comparator 466*b*, a seventh comparator 467*b* and a sampler 470*b*.

The data I/O pad 450*b* may receive the first data signal DS12.

The first comparator 461*b* may generate a first comparison signal CS12 by comparing a voltage level of the first data signal DS12 with the first reference voltage level VRL12. The second comparator 462*b* may generate a second comparison signal CS22 by comparing the voltage level of the first data signal DS12 with the second reference voltage level VRL22. The third comparator 463*b* may generate a third comparison signal CS32 by comparing the voltage level of the first data signal DS12 with the third reference voltage level VRL32. The fourth comparator 464*b* may generate a fourth comparison signal CS42 by comparing the voltage level of the first data signal DS12 with the fourth reference voltage level VRL42. The fifth comparator 465*b* may generate a fifth comparison signal CS52 by comparing the voltage level of the first data signal DS12 with the fifth reference voltage level VRL52. The sixth comparator 466*b* may generate a sixth comparison signal CS62 by comparing the voltage level of the first data signal DS12 with the sixth reference voltage level VRL62. The seventh comparator 467*b* may generate a seventh comparison signal CS72 by comparing the voltage level of the first data signal DS12 with the seventh reference voltage level VRL72. The first, second, third, fourth, fifth, sixth and seventh comparators 461*b*, 462*b*, 463*b*, 464*b*, 465*b*, 466*b* and 467b may operate based on first, second, third, fourth, fifth, sixth and seventh reference voltages VREF12, VREF22, VREF32, VREF42, VREF52, VREF62 and VREF72 having the first, second, third, fourth, fifth, sixth and seventh reference voltage levels VRL12, VRL22, VRL32, VRL42, VRL52, VRL62 and VRL72, respectively.

The sampler 470b may obtain the value of the first bit OB12 based on the first sensing setting signal SS1 and at least one of the first, second, third, fourth, fifth, sixth and seventh comparison signals CS12, CS22, CS32, CS42, CS52, CS62 and CS72.

In some example embodiments, when the sampler 470b is set to obtain the MSB of the first data DAT12, the sampler 470b may obtain the value of the first bit OB12 using only the fourth comparison signal CS42.

In some example embodiments, when a sampler included in the second data receiving circuit 422b is set to obtain the intermediate or middle bit (e.g., a central significant bit (CSB)) of the first data DAT12, the sampler may obtain the value of the second bit OB22 using the fourth comparison signal CS42 and one of the second and sixth comparison signals CS22 and CS62.

In some example embodiments, when a sampler included in the third data receiving circuit 432b is set to obtain the LSB of the first data DAT12, the sampler may obtain the value of the third bit OB32 using the fourth comparison signal CS42, one of the second and sixth comparison signals CS22 and CS62, and one of the first, third, fifth and seventh comparison signals CS12, CS32, CS52 and CS72.

Figure 15:
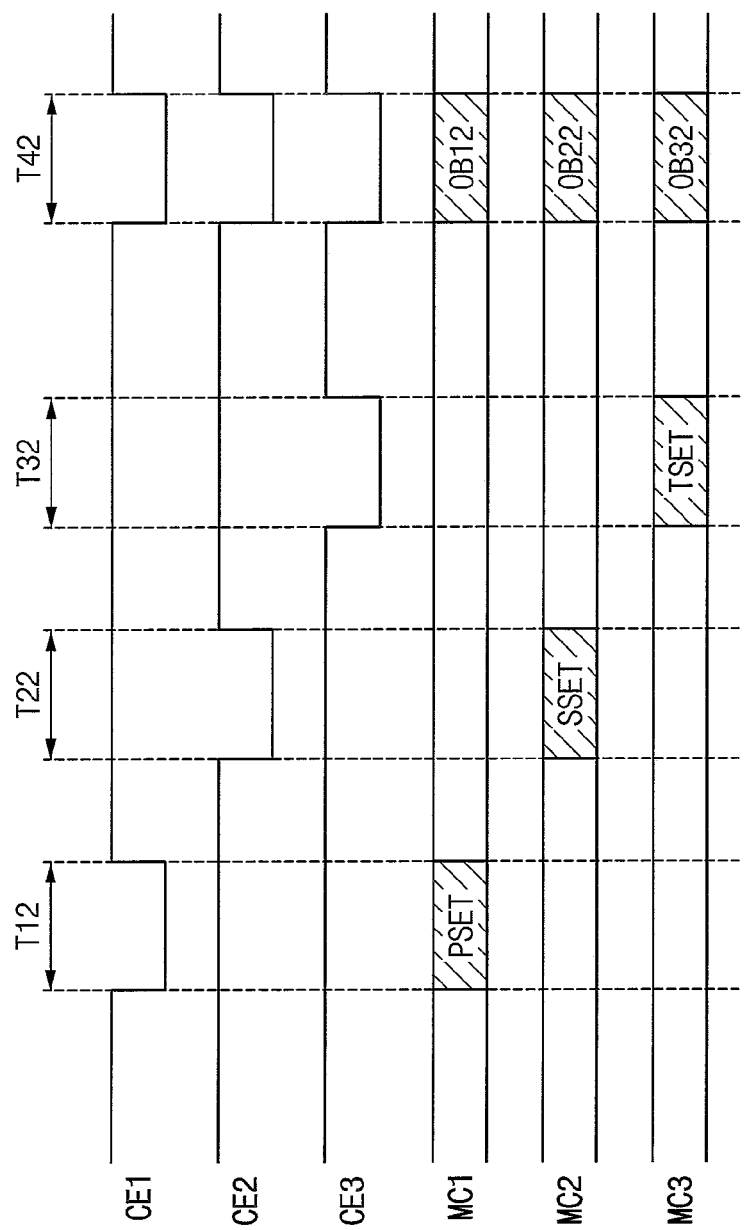
FIG. 15 is a diagram for describing an operation of the memory system of FIG. 11.

FIG. 15 is a diagram for describing an operation of the memory system of FIG. 11. The descriptions repeated with FIG. 9 will be omitted for conciseness.

Referring to FIG. 15, an operation according to example embodiments in which the memory controller 200b transmits the first data signal DS12 based on the PAM8 scheme to the first, second and third memory chips 410b, 420b and 430b is illustrated.

First, during a time interval T12, only the first memory chip 410b may be enabled by activating only the first chip enable signal CE1, and a first setting operation PSET may be performed on the first memory chip 410b based on the first sensing setting signal SS1. For example, the first setting operation PSET may be an operation in which the first memory chip 410b is set to obtain the first bit B12 that is the MSB of the first data DAT12 based on the first data signal DS12.

Next, during a time interval T22, only the second memory chip 420b may be enabled by activating only the second chip enable signal CE2, and a second setting operation SSET may be performed on the second memory chip 420b based on the second sensing setting signal SS2. For example, the second setting operation SSET may be an operation in which the second memory chip 420b is set to obtain the second bit B22 that is the CSB of the first data DAT12 based on the first data signal DS12.

Next, during a time interval T32, only the third memory chip 430b may be enabled by activating only the third chip enable signal CE3, and a third setting operation TSET may be performed on the third memory chip 430b based on the third sensing setting signal SS3. For example, the third setting operation TSET may be an operation in which the third memory chip 430b is set to obtain the third bit B32 that is the LSB of the first data DAT12 based on the first data signal DS12. The third setting operation TSET may be referred to as a tertiary setting operation.

After that, during a time interval T42, the first, second, and third memory chips 410b, 420b and 430b may be simultaneously enabled by activating the first, second and third chip enable signals CE1, CE2 and CE3, and the memory controller 200b may generate and output the first data signal DS12. While the first, second, and third memory chips 410b, 420b and 430b have the enabled state, the first, second, and third memory chips 410b, 420b and 430b may simultaneously receive the first data signal DS12, may simultaneously obtain the first, second and third bits OB12, OB22 and OB32, and may operate based on the first, second and third bits OB12, OB22 and OB32. For example, the first, second and third bits OB12, OB22 and OB32 may be simultaneously written into one of the first memory devices 414, one of the second memory devices 424 and one of the third memory devices 434 included in the first, second, and third memory chips 410b, 420b and 430b.

Although not illustrated in detail, as with that described with reference to FIGS. 10A and 10B, the total time required for the data write operation on three memory chips may be reduced according to example embodiments. Accordingly, the performance of the entire memory system may be improved.

Although example embodiments are described based on the PAM4 scheme and the PAM8 scheme, example embodiments are not limited thereto, and example embodiments may be extended and applied to the PAM2$^M$ scheme.

Figure 16:
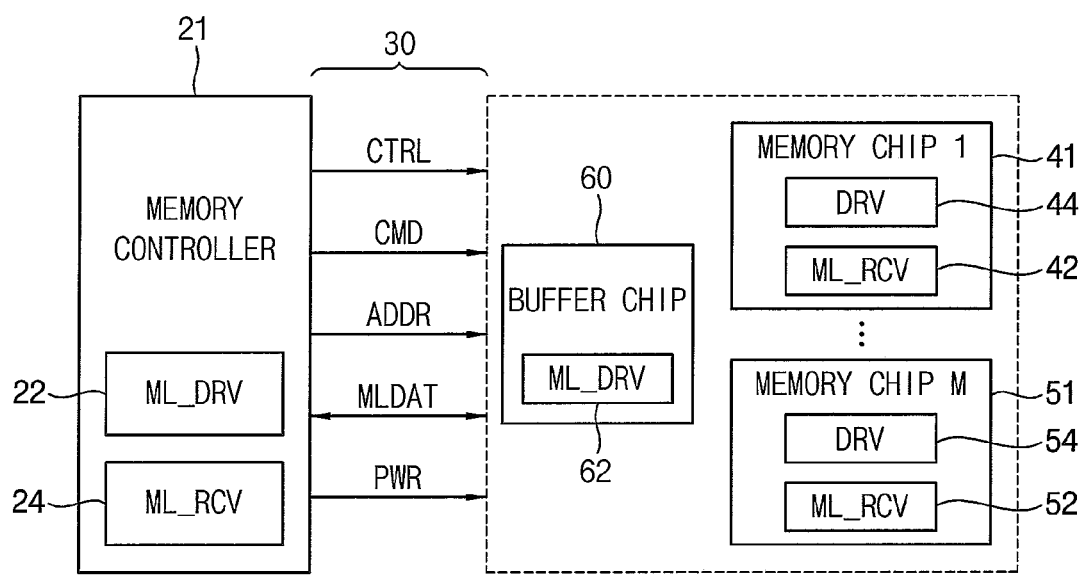
FIG. 16 is a block diagram illustrating a memory system according to example embodiments.

FIG. 16 is a block diagram illustrating a memory system according to example embodiments. The descriptions repeated with FIG. 1 will be omitted for conciseness.

Referring to FIG. 16, a memory system 11 includes a memory controller 21 and M memory chips 41 and 51, where M is a natural number greater than or equal to two. The memory system 11 may further include a plurality of signal lines 30 and a buffer chip 60.

The memory system 11 of FIG. 16 may be substantially the same as the memory system 10 of FIG. 1, except that the memory system 11 further includes the buffer chip 60 and thus further includes a data receiving circuit (ML_RCV) 24 and data driving circuits (DRV) 44 and 54.

The buffer chip 60 may be disposed between the one channel and the M memory chips 41 and 51. The buffer chip 60 generates a data signal MLDAT based on outputs from the M memory chips 41 and 51 and the multi-level signaling scheme, and outputs the data signal MLDAT through the one channel. For example, the buffer chip 60 may generate the data signal MLDAT having one of the 2$^M$ voltage levels, and the data signal MLDAT may represent data including M bits that are simultaneously output from the M memory chips 41 and 51. For example, the buffer chip 60 may include a data driving circuit (ML_DRV) 62 that generates the data signal MLDAT. For example, the data driving circuit 62 may be substantially the same as the data driving circuit (ML_DRV) 22 included in the memory controller 21.

The memory controller 21 receives the data signal MLDAT transmitted through the one channel, and operates based on the data signal MLDAT. For example, the memory controller 21 may simultaneously obtain the M bits included in the data based on the data signal MLDAT, and may operate based on the M bits. For example, the memory controller 21 may include the data receiving circuit 24 that obtains the M bits. For example, the data receiving circuit 24 may be substantially the same as the data receiving circuits 42 and 52 included in the memory chips 41 and 51. For example, the data receiving circuit 24 may be included in a memory interface (e.g., the memory interface 650 in FIG. 3) of the memory controller 21.

Each of the memory chips 41 and 51 may include a respective one of the data driving circuits (DRV) 44 and 54 that outputs the respective one of the M bits. Unlike the data driving circuit 22 included in the memory controller 21 and the data driving circuit 62 included in the buffer chip 60, each of the data driving circuits 44 and 54 may output the respective one of the M bits based on a general binary scheme (e.g., a non-return-to-zero (NRZ) scheme) other than the multi-level signaling scheme. For example, the data driving circuits 44 and 54 may be included in a buffer circuit (e.g., the buffer circuit 730 in FIG. 4) of the memory chips 41 and 51, respectively.

Figure 17:
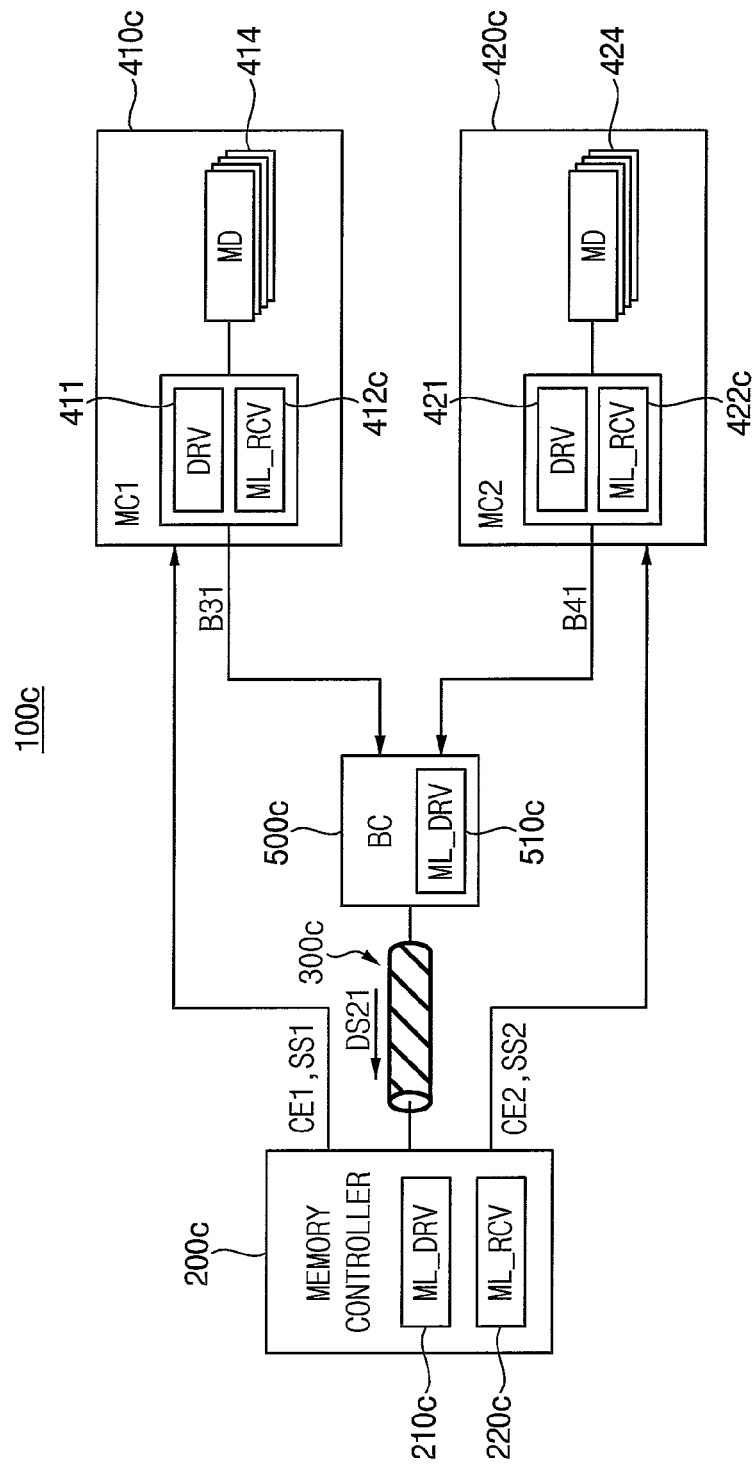
FIGS. 17 and 18 are block diagrams illustrating examples of the memory system of FIG. 16, according to example embodiments.
Figure 18:
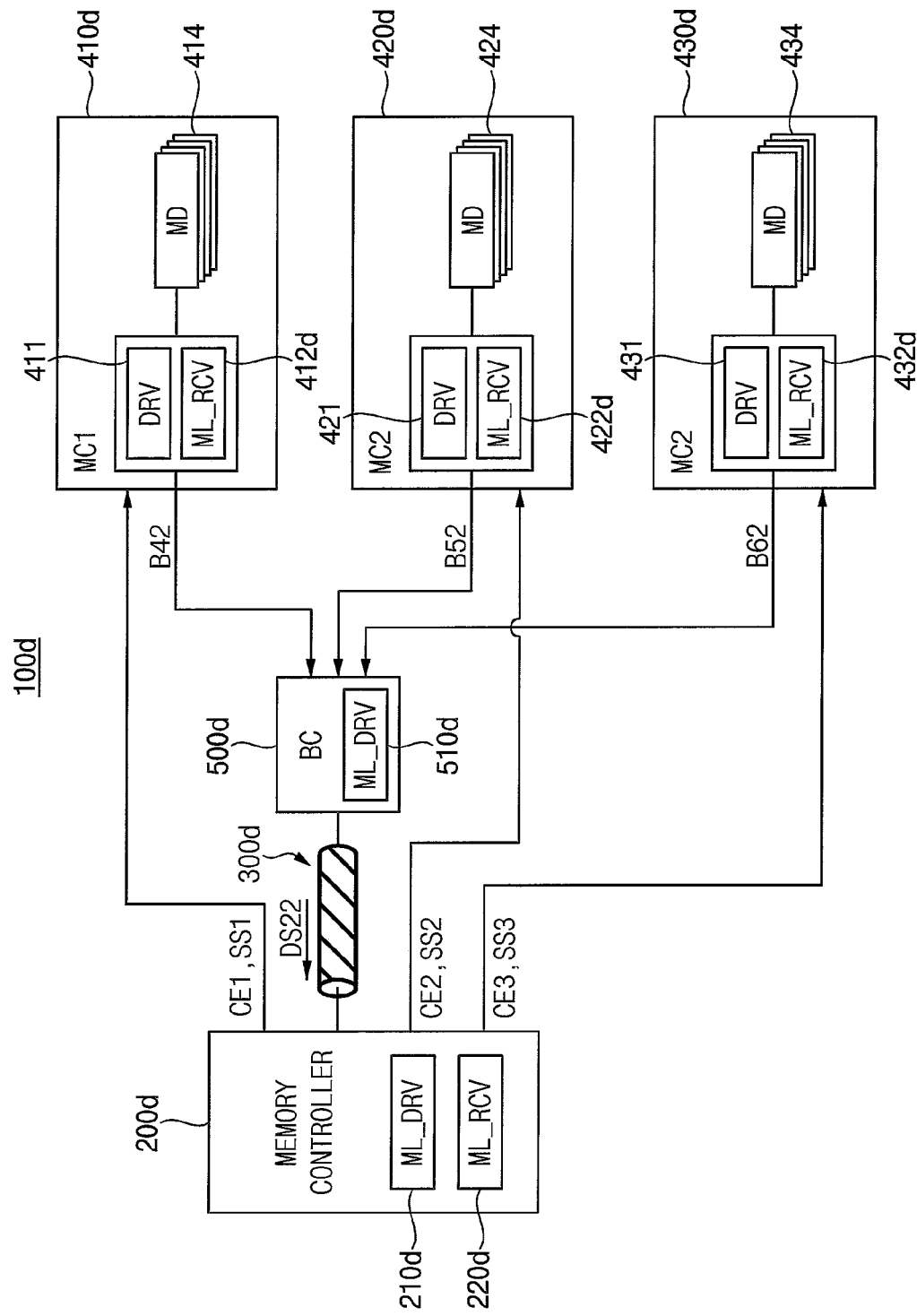

FIGS. 17 and 18 are block diagrams illustrating examples of the memory system of FIG. 16. The descriptions repeated with FIGS. 2 and 11 will be omitted for conciseness.

Referring to FIG. 17, a memory system 100c includes a memory controller 200c, a first channel 300c, a first memory chip 410c, a second memory chip 420c and a buffer chip 500c. FIG. 17 illustrates an example of the memory system 11 of FIG. 16 where M is 2 and a data signal is generated based on the PAM4 scheme.

The memory system 100c of FIG. 17 may be substantially the same as the memory system 100a of FIG. 2, except that the memory system 100c further includes the buffer chip 500c and thus further includes a data receiving circuit (ML_RCV) 220c and data driving circuits (DRV) 411 and 421. A data driving circuit 210c, first and second data receiving circuits 412c and 422c, and a plurality of first and second memory devices 414 and 424 in FIG. 17 may be substantially the same as the data driving circuit 210a, the first and second data receiving circuits 412a and 422a, and the plurality of first and second memory devices 414 and 424 in FIG. 2, respectively.

The first and second memory chips 410c and 420c may be enabled based on the first and second chip enable signals CE1 and CE2, respectively. When both the first and second memory chips 410c and 420c have the enabled state, the first and second memory chips 410c and 420c may simultaneously output third and fourth bits B31 and B41 using the data driving circuits 411 and 421.

In some example embodiments, the third and fourth bits B31 and B41 may be a part of read data retrieved from the first and second memory chips 410c and 420c, and the memory controller 200c may simultaneously perform a data read operation on the first and second memory chips 410c and 420c based on the third and fourth bits B31 and B41. Although not illustrated in FIG. 17, a read command and a read address for performing the data read operation may be provided from the memory controller 200c.

The buffer chip 500c may be disposed between the first channel 300c and the first and second memory chips 410c and 420c, may generate a second data signal DS21 having one of the four voltage levels, and may output the second data signal DS21 through the first channel 300c. The second data signal DS21 may represent second data including the third and fourth bits B31 and B41. The buffer chip 500c may include a data driving circuit 510c that generates the second data signal DS21. For example, the data driving circuit 510c may be implemented as illustrated in FIG. 7.

In some example embodiments, the third bit B31 may correspond to the MSB of the second data, and the fourth bit B41 may correspond to the LSB of the second data. Before both of the first and second memory chips 410c and 420c have the enabled state and simultaneously output the third and fourth bits B31 and B41, the first memory chip 410c may be enabled and may be set such that the first memory chip 410c outputs the MSB, and the second memory chip 420c may be enabled and may be set such that the second memory chip 420c outputs the LSB. Such setting operation may be performed based on the first and second sensing setting signals SS1 and SS2.

The memory controller 200c may receive the second data signal DS21, may simultaneously obtain the third bit B31 output from the first memory chip 410c and the fourth bit B41 output from the second memory chip 420c based on the second data signal DS21, and may operate based on the third and fourth bits B31 and B41. The memory controller 200c may include the data receiving circuit 220c that obtains the third and fourth bits B31 and B41. For example, the data receiving circuit 220c may be implemented as illustrated in FIG. 8.

Referring to FIG. 18, a memory system 100d includes a memory controller 200d, a first channel 300d, a first memory chip 410d, a second memory chip 420d, a third memory chip 430d and a buffer chip 500d. FIG. 18 illustrates an example of the memory system 11 of FIG. 16 where M is 3 and a data signal is generated based on the 8-level scheme.

The memory system 100d of FIG. 18 may be substantially the same as the memory system 100b of FIG. 11, except that the memory system 100d further includes the buffer chip 500d and thus further includes a data receiving circuit (ML_RCV) 220d and data driving circuits (DRV) 411, 421 and 431. A data driving circuit 210d, first, second and third data receiving circuits 412d, 2d, 422d and 432d, and a plurality of first, second and third memory devices 414, 424 and 434 in FIG. 18 may be substantially the same as the data driving circuit 210b, the first, second and third data receiving circuits 412b, 422b and 432b, and the plurality of first, second and third memory devices 414, 424 and 434 in FIG. 11, respectively.

The first, second and third memory chips 410d, 420d and 430d may be enabled based on the first, second and third chip enable signals CE1, CE2 and CE3, respectively. When the first, second and third memory chips 410d, 420d and 430d have the enabled state, the first, second and third memory chips 410d, 420d and 430d may simultaneously output fourth, fifth and sixth bits B42, B52 and B62 that are different from each other using the data driving circuits 411, 421 and 431.

The buffer chip 500d may be disposed between the first channel 300d and the first, second and third memory chips 410d, 420d and 430d, may generate a second data signal DS22 having one of the eight voltage levels, and may output the second data signal DS22 through the first channel 300d. The second data signal DS22 may represent second data including the fourth, fifth and sixth bits B42, B52 and B62. The buffer chip 500d may include a data driving circuit 510d that generates the second data signal DS22. For example, the data driving circuit 510d may be implemented as illustrated in FIG. 13.

The memory controller 200d may receive the second data signal DS22, may simultaneously obtain the fourth bit B42 output from the first memory chip 410d, the fifth bit B52 output from the second memory chip 420d and the sixth bit B62 output from the third memory chip 430d based on the second data signal DS22, and may operate based on the fourth, fifth and sixth bits B42, B52 and B62. The memory controller 200d may include a data receiving circuit 220d that obtains the fourth, fifth and sixth bits B42, B52 and B62. For example, the data receiving circuit 220d may be implemented as illustrated in FIG. 14.

In some example embodiments, when the data write operation described with reference to FIGS. 2 and 11 is performed on the memory systems 100c and 100d of FIGS. 17 and 18, the buffer chips 500c and 500d may be disabled.

Figure 19:
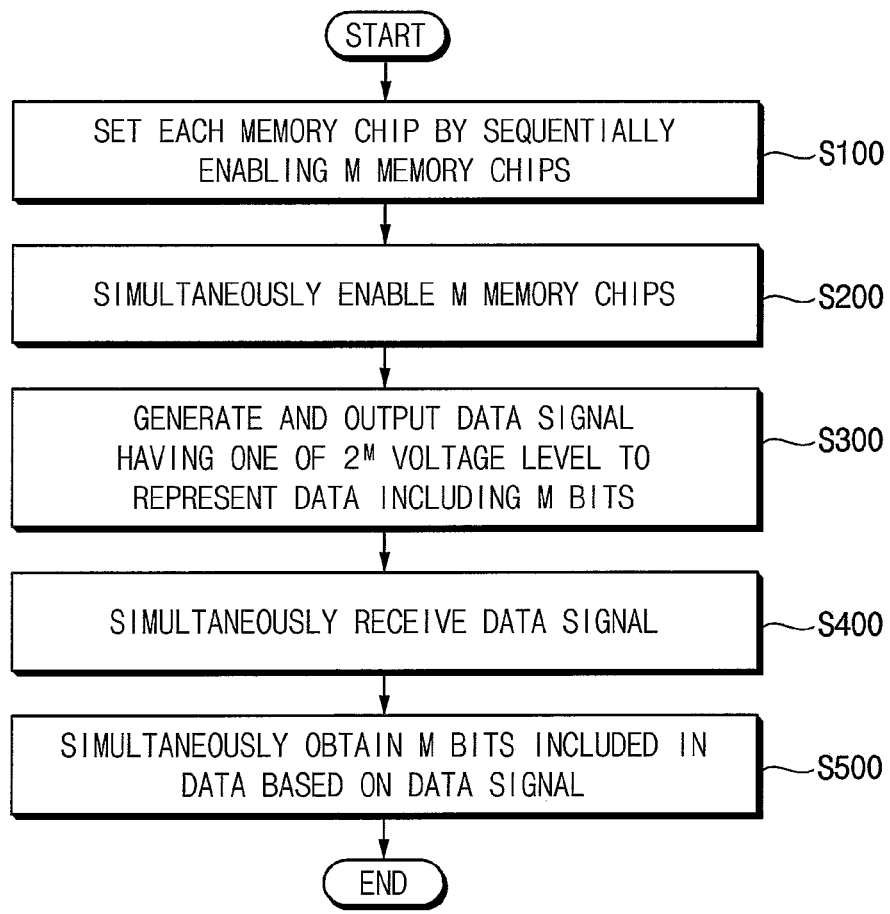
FIGS. 19 and 20 are flowcharts illustrating a method of operating a memory system according to example embodiments.
Figure 20:
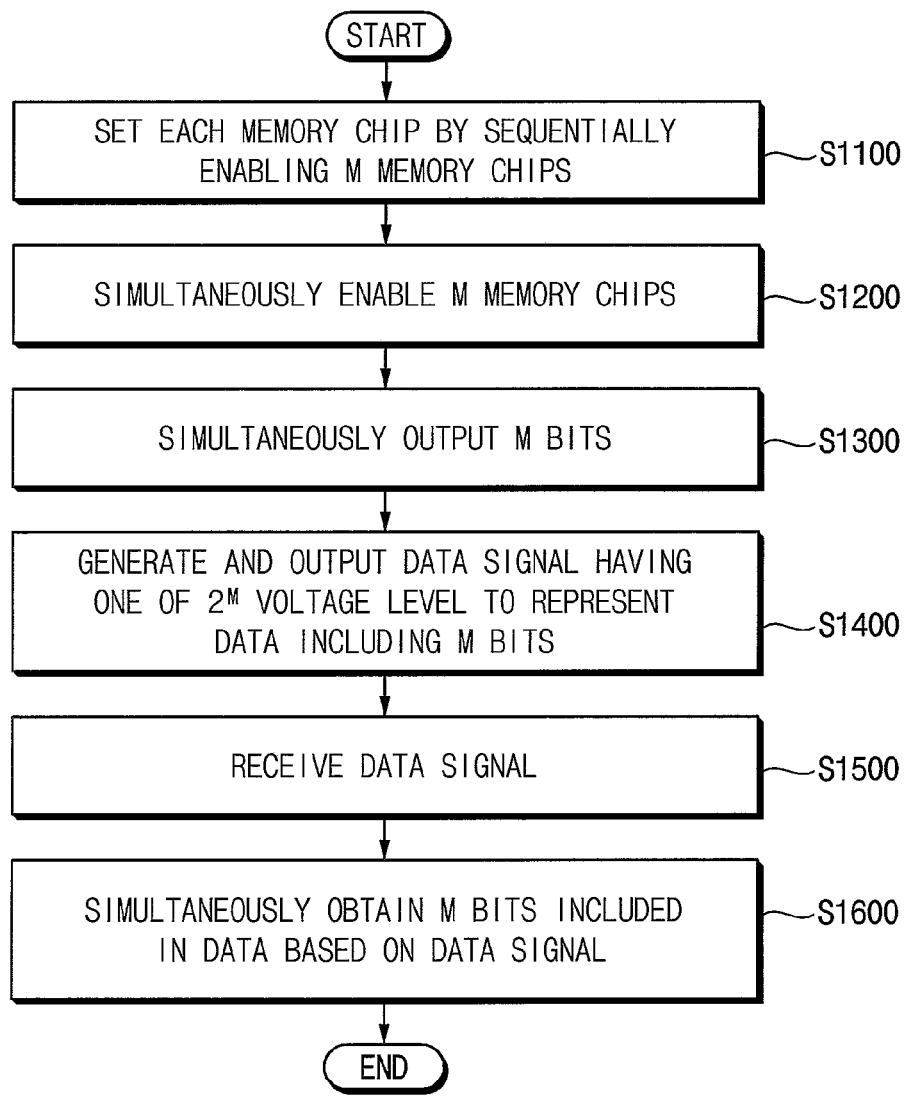

FIGS. 19 and 20 are flowcharts illustrating a method of operating a memory system according to example embodiments.

Referring to FIGS. 1 and 19, in a method of operating a memory system according to example embodiments, each of the M memory chips 40 and 50 that are commonly connected to the memory controller 20 through the one channel is set, by sequentially enabling the M memory chips 40 and 50, such that each memory chip obtains one bit based on the data signal MLDAT (operation S100). For example, the first and second setting operations PSET and SSET in FIG. 9 and/or the first, second and third setting operations PSET, SSET and TSET in FIG. 15 may be sequentially performed.

The M memory chips 40 and 50 are simultaneously enabled (operation S200). The memory controller 20 generates the data signal MLDAT having one of the $2^M$ voltage levels different from each other, and outputs the data signal MLDAT through the one channel (operation S300). The data signal MLDAT represents the data including the M bits. For example, operation S300 may be performed by the data driving circuit 210a in FIG. 7 and/or the data driving circuit 210b in FIG. 13.

When the M memory chips 40 and 50 have the enabled state, the M memory chips 40 and 50 simultaneously receive the data signal MLDAT transmitted through the one channel (operation S400). The M memory chips 40 and 50 simultaneously obtain the M bits included in the data based on the data signal (operation S500). Each of the M memory chips 40 and 50 obtains a respective one of the M bits and operates based on the respective one of the M bits. For example, operation S500 may be performed by the data receiving circuit 412a in FIG. 8 and/or the data receiving circuit 412b in FIG. 14. For example, as described with reference to FIGS. 9 and 15, the operation of obtaining the bits and the data write operation may be simultaneously performed.

Referring to FIGS. 16 and 20, in a method of operating a memory system according to example embodiments, each of the M memory chips 41 and 51 that are commonly connected to the memory controller 21 through the one channel is set, by sequentially enabling the M memory chips 41 and 51, such that each memory chip outputs one bit for generating the data signal MLDAT (operation S1100). Operation S1100 may be similar to operation S100 in FIG. 19.

The M memory chips 41 and 51 are simultaneously enabled (operation S1200). When the M memory chips 41 and 51 have the enabled state, the M memory chips 41 and 51 simultaneously output the M bits (operation S1300). The buffer chip 60 generates the data signal MLDAT having one of the $2^M$ voltage levels different from each other, and outputs the data signal MLDAT through the one channel (operation S1400). The data signal MLDAT represents the data including the M bits that are simultaneously output from the M memory chips 41 and 51. Operation S1200 may be substantially the same as operation S200 in FIG. 19, and S1400 may be similar to operation S300 in FIG. 19.

The memory controller 21 receives the data signal MLDAT transmitted through the one channel (operation S1500). The memory controller 21 simultaneously obtains the M bits included in the data based on the data signal MLDAT, and operates based on the M bits (operation S1600). Operation S1600 may be similar to operation S500 in FIG. 19.

In some example embodiments, a method of operating a memory system according to example embodiments may be implemented including all of operations in FIGS. 19 and 20, and the redundant operation may be omitted. For example, when the operations in FIG. 19 are sequentially performed and then the operations in FIG. 20 are sequentially performed, operations S1100 and S1200 in FIG. 20 corresponding to operations S100 and S200 in FIG. 19 may be omitted. It is to be noted that the order of operations in FIGS. 19 and 20 is only exemplary, and in some example embodiments, some operations may be performed in a different order.

Figure 21:
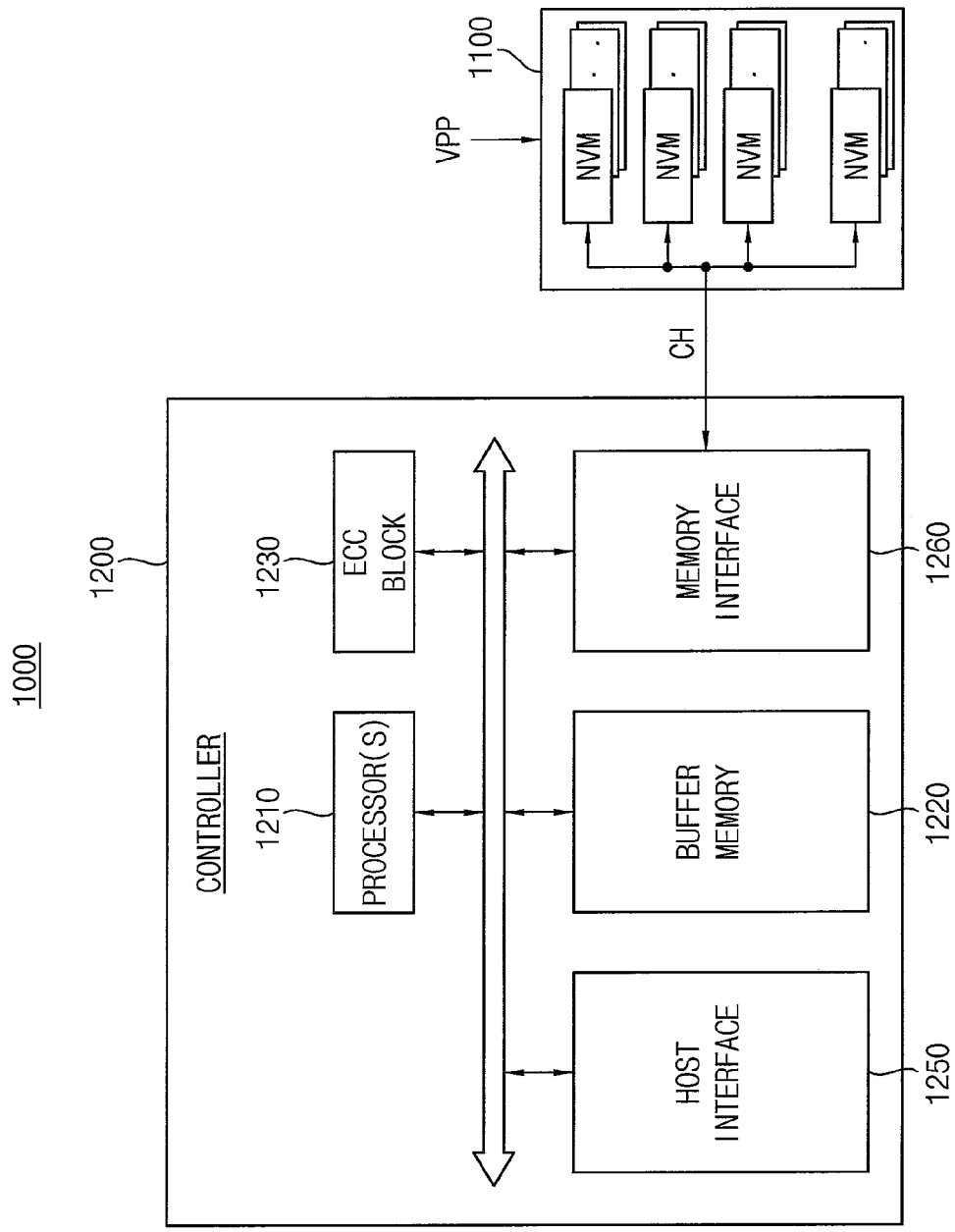
FIG. 21 is a block diagram illustrating a storage device according to example embodiments.

FIG. 21 is a block diagram illustrating a storage device according to example embodiments.

Referring to FIG. 21, a storage device 1000 includes a plurality of nonvolatile memory chips 1100 and a storage controller 1200. For example, the storage device 1000 may be any storage device such as an embedded multimedia card (eMMC), a universal flash storage (UFS), a solid state disc or solid state drive (SSD), etc.

The storage controller 1200 may be connected to the plurality of nonvolatile memory chips 1100 via a channel CH. The storage controller 1200 may correspond to the memory controller included in the memory system according to example embodiments. The storage controller 1200 may include one or more processors 1210, a buffer memory 1220, an ECC block 1230, a host interface 1250 and a memory interface 1260 that correspond to the processor 610, the buffer memory 620, the ECC block 640, the host interface 630 and the memory interface 650 in FIG. 3, respectively.

Each of the nonvolatile memory chips 1100 may include a plurality of nonvolatile memory devices (NVM), and may be optionally supplied with an external high voltage VPP. The nonvolatile memory chips 1100 may correspond to the memory chips included in the memory system according to example embodiments. Some or all of the nonvolatile memory chips 1100 may be commonly connected to the storage controller 1200 through one channel CH, and the nonvolatile memory chips 1100 may exchange data signals with the storage controller 1200 based on the multi-level signaling scheme according to example embodiments while all of the nonvolatile memory chips 1100 have the enabled state.

The inventive concept may be applied to various devices and systems that include the memory devices, the memory systems and the storage devices. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an interne of everything (IoE) device, an e-book reader, a virtual reality (VR) device, an augmented reality (AR) device, a robotic device, a drone, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A memory system comprising:
a memory controller configured to generate a first data signal having one of $2^M$ voltage levels different from each other, where M is a natural number greater than or equal to two, and to output the first data signal through a first channel, the first data signal representing first data including M bits; and
M memory chips commonly connected to the memory controller through the first channel,
wherein, when the M memory chips have an enabled state, the M memory chips are configured to simultaneously receive the first data signal transmitted through the first channel from the memory controller, and
wherein each of the M memory chips is configured to obtain a respective one of the M bits, and to operate based on the respective one of the M bits, and
a data driving circuit configured to generate the first data signal, wherein the data driving circuit includes:
a sampler configured to generate $2^M-1$ driving signals based on values of the M bits, and
$2^M-1$ drivers, each driver configured to
receive a respective driving signal of the $2^M-1$ driving signals, and
based on the respective driving signal, generate a respective output signal having one of two respective voltage levels, wherein the first data signal is based on an output of the $2^M-1$ drivers.

2. The memory system of claim 1, wherein:
M is two,
the M memory chips include a first memory chip and a second memory chip that are different from each other,
the M bits included in the first data include a first bit and a second bit,
the first memory chip is configured to obtain the first bit based on the first data signal, and to operate based on the first bit, and
the second memory chip is configured to obtain the second bit based on the first data signal, and to operate based on the second bit.

3. The memory system of claim 2, wherein:
the first bit is a most significant bit (MSB) of the first data, and
the second bit is a least significant bit (LSB) of the first data.

4. The memory system of claim 2, wherein:
the $2^M$ voltage levels include a first voltage level, a second voltage level, a third voltage level and a fourth voltage level that are different from each other, and wherein the $2^M-1$ drivers include:
a first driver configured to generate a respective output signal having, as one of the two respective voltage levels of the first driver, the first voltage level,
a second driver configured to generate a respective output signal having, as one of the two respective voltage levels of the second driver, the second voltage level, and
a third driver configured to generate a respective output signal having, as one of the two respective voltage levels of the third driver, the third voltage level.

5. The memory system of claim 4, wherein at least one of the first driver, the second driver, and the third driver is configured to generate the respective output signal having, as another of the two respective voltage levels of the at least one of the first driver, the second driver, and the third driver, the fourth voltage level.

6. The memory system of claim 4, wherein the first memory chip includes:
a data receiving circuit configured to obtain a value of the first bit based on a first reference voltage level, a second reference voltage level and a third reference voltage level that are different from each other, and a first sensing setting signal.

7. The memory system of claim 6, wherein the data receiving circuit includes:
a first comparator configured to generate a first comparison signal by comparing a voltage level of the first data signal with the first reference voltage level;
a second comparator configured to generate a second comparison signal by comparing the voltage level of the first data signal with the second reference voltage level;
a third comparator configured to generate a third comparison signal by comparing the voltage level of the first data signal with the third reference voltage level; and
a second sampler configured to obtain the value of the first bit based on the first sensing setting signal and at least one of the first, second and third comparison signals.

8. The memory system of claim 7, wherein the second sampler is configured:
to obtain the value of the first bit using only the second comparison signal among the first, second and third comparison signals when the first bit is an MSB of the first data, and
to obtain the value of the first bit using the second comparison signal and one of the first and third comparison signals among the first, second and third comparison signals when the first bit is a LSB of the first data.

9. The memory system of claim 6, wherein:
the first reference voltage level is a level between the first voltage level and the second voltage level,
the second reference voltage level is a level between the second voltage level and the third voltage level, and
the third reference voltage level is a level between the third voltage level and the fourth voltage level.

10. The memory system of claim 2, wherein:
the first memory chip is configured to receive a first chip enable signal from the memory controller,
the second memory chip is configured to receive a second chip enable signal that is different from the first chip enable signal from the memory controller, and
the first and second chip enable signals are simultaneously activated such that the first and second memory chips simultaneously receive the first data signal.

11. The memory system of claim 2, wherein, before both of the first and second memory chips have the enabled state and simultaneously receive the first data signal, the first memory chip is configured to obtain the first bit in response to receiving the first data signal, and the second memory chip is configured to obtain the second bit in response to receiving the first data signal.

12. The memory system of claim 2, wherein the first and second memory chips are configured to simultaneously perform a data write operation based on the first and second bits.

13. The memory system of claim 1, wherein:
M is three,
the M memory chips include a first memory chip, a second memory chip and a third memory chip that are different from each other, the M bits included in the first data include a first bit, a second bit and a third bit, the first memory chip is configured to obtain the first bit based on the first data signal, and to operate based on the first bit, the second memory chip is configured to obtain the second bit based on the first data signal, and to operate based on the second bit, and the third memory chip is configured to obtain the third bit based on the first data signal, and to operate based on the third bit.

14. The memory system of claim 1, further comprising:
a buffer chip disposed between the first channel and the M memory chips, configured to generate a second data signal having one of the $2^M$ voltage levels, and to output the second data signal through the first channel, the second data signal representing second data including M bits simultaneously output from the M memory chips, wherein the memory controller is configured to receive the second data signal transmitted through the first channel, to simultaneously obtain the M bits included in the second data based on the second data signal, and to operate based on the M bits included in the second data.

15. The memory system of claim 14, wherein:
M is two,
the M memory chips include a first memory chip and a second memory chip that are different from each other,
the M bits included in the second data include a first bit and a second bit, and
the memory controller is configured to simultaneously obtain the first bit output from the first memory chip and the second bit output from the second memory chip based on the second data signal, and to operate based on the first and second bits.

16. The memory system of claim 15, wherein the memory controller is configured to simultaneously perform a data read operation on the first and second memory chips based on the first and second bits.

17. A method of operating a memory system that includes a memory controller and M memory chips, where M is a natural number greater than or equal to two, the method comprising:

enabling the M memory chips commonly connected to the memory controller through a first channel;

generating, by the memory controller, a first data signal having one of $2^M$ voltage levels that are different from each other, the first data signal representing first data including M bits, wherein generating the first data signal comprises generating, using a sampler, $2^M-1$ driving signals based on values of the M bits receiving, at each of $2^M-1$ drivers, respective driving signals of the $2^M-1$ driving signals, and based on the respective driving signals, generating, at each of the $2^M-1$ drivers, a respective output signal having one of two respective voltage levels, wherein the first data signal is based on an output of the $2^M-1$ drivers;

outputting, by the memory controller, the first data signal through the first channel;

when the M memory chips have an enabled state, simultaneously receiving, by the M memory chips, the first data signal transmitted through the first channel; and simultaneously obtaining, by the M memory chips, the M bits included in the first data based on the first data signal, each of the M memory chips obtaining a respective one of the M bits and operating based on the respective one of the M bits.

18. The method of claim 17, further comprising:
setting each of the M memory chips by sequentially enabling the M memory chips such that each of the M memory chips obtains the respective one of the M bits based on the first data signal.

19. The method of claim 17, wherein the memory system further includes a buffer chip disposed between the first channel and the M memory chips, and
the method further comprises:
when the M memory chips have the enabled state, simultaneously outputting, by the M memory chips, M output bits;

generating, by the buffer chip, a second data signal having one of the $2^M$ voltage levels, the second data signal representing second data including the M output bits simultaneously output from the M memory chips;

outputting, by the buffer chip, the second data signal through the first channel;

receiving, by the memory controller, the second data signal transmitted through the first channel; and simultaneously obtaining, by the memory controller, the M output bits included in the second data based on the second data signal, the memory controller operating based on the M output bits included in the second data.

20. A storage device comprising:
a first channel;
a storage controller connected to the first channel, configured to generate a first chip enable signal and a second chip enable signal, to generate a first data signal having one of a first voltage level, a second voltage level, a third voltage level and a fourth voltage level, the first through fourth voltage levels being different from each other, and to output the first data signal through the first channel, the first data signal representing first data including a first bit and a second bit, wherein the storage controller comprises a data driving circuit configured to generate the first data signal, wherein the data driving circuit includes:

a sampler configured to generate three driving signals based on values of the first bit and the second bit, and three drivers, each driver configured to
receive a respective driving signal of the three driving signals, and
based on the respective driving signal, generate a respective output signal having one of two respective voltage levels, wherein the first data signal is based on an output of the three drivers; and a first nonvolatile memory chip and a second nonvolatile memory chip commonly connected to the storage controller through the first channel, the first nonvolatile memory chip configured to receive the first chip enable signal, and the second nonvolatile memory chip configured to receive the second chip enable signal, wherein the first nonvolatile memory chip is enabled by activating the first chip enable signal, and is set such that the first nonvolatile memory chip obtains the first bit based on the first data signal, wherein the second nonvolatile memory chip is enabled by activating the second chip enable signal, and is set such that the second nonvolatile memory chip obtains the second bit based on the first data signal, wherein the first and second nonvolatile memory chips are enabled by activating the first and second chip enable signals, and wherein, when both of the first and second nonvolatile memory chips have an enabled state, the first and second nonvolatile memory chips are configured to simultaneously receive the first data signal transmitted through the first channel, to simultaneously obtain the first and second bits included in the first data based on the first data signal, and to simultaneously perform a data write operation based on the first and second bits.

\* \* \* \* \*